US009410010B2

(12) United States Patent
Roberts et al.

(10) Patent No.: US 9,410,010 B2
(45) Date of Patent: *Aug. 9, 2016

(54) UREA-TERMINATED POLYURETHANE DISPERSANTS

(75) Inventors: C. Chad Roberts, Wilmington, DE (US); Patrick F. McIntyre, West Chester, PA (US); Michael Stephen Wolfe, Wimington, DE (US); Xiaoqing Li, Newark, DE (US); Hari Babu Sunkara, Hockessin, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/328,158

(22) Filed: Dec. 4, 2008

(65) Prior Publication Data
US 2012/0035317 A1 Feb. 9, 2012

Related U.S. Application Data

(60) Provisional application No. 61/005,977, filed on Dec. 10, 2007.

(51) Int. Cl.
| | | |
|---|---|---|
| *B41J 2/01* | (2006.01) | |
| *B41J 2/17* | (2006.01) | |
| *B41J 2/175* | (2006.01) | |
| *C08G 18/08* | (2006.01) | |
| *C08J 3/00* | (2006.01) | |
| *C08K 3/20* | (2006.01) | |
| *C08L 75/00* | (2006.01) | |
| *C09D 5/00* | (2006.01) | |
| *C09D 11/00* | (2006.01) | |
| *G01D 11/00* | (2006.01) | |
| *C08G 18/12* | (2006.01) | |
| *C08G 18/32* | (2006.01) | |
| *C08G 18/34* | (2006.01) | |
| *C08G 18/48* | (2006.01) | |
| *C08G 18/66* | (2006.01) | |
| *C09D 11/326* | (2014.01) | |
| *C09D 17/00* | (2006.01) | |

(52) U.S. Cl.
CPC ............ *C08G 18/0823* (2013.01); *C08G 18/12* (2013.01); *C08G 18/3206* (2013.01); *C08G 18/348* (2013.01); *C08G 18/4854* (2013.01); *C08G 18/6692* (2013.01); *C09D 11/326* (2013.01); *C09D 17/001* (2013.01)

(58) Field of Classification Search
CPC ............ C08G 18/0823; C08G 18/12; C08G 18/3206; C08G 18/348; C08G 18/4854; C08G 18/6692; C09D 11/326; C09D 17/001
USPC .................. 347/1, 85, 95, 100; 523/160, 161; 524/591, 839, 840
See application file for complete search history.

(56) References Cited

U.S. PATENT DOCUMENTS

| | | |
|---|---|---|
| 3,412,054 A | 11/1968 | Milligan et al. |
| 3,419,553 A | 12/1968 | Dieterich et al. |
| 3,479,310 A | 11/1969 | Dieterich et al. |
| 4,108,814 A | 8/1978 | Reiff et al. ................... 524/839 |
| 4,269,748 A | 5/1981 | Nachtkamp et al. ........ 524/839 |
| 4,303,774 A | 12/1981 | Nachtkamp et al. .......... 528/71 |
| 4,408,008 A | 10/1983 | Markusch .................. 524/591 |
| 4,501,852 A | 2/1985 | Markusch et al. ........... 524/591 |
| 4,647,643 A | 3/1987 | Zdrahala et al. ............... 528/28 |
| 4,701,480 A | 10/1987 | Markusch et al. ........... 523/340 |
| 4,801,644 A | 1/1989 | Coogan ....................... 524/839 |
| 4,829,122 A | 5/1989 | Pedain et al. ................ 524/591 |
| 5,022,592 A | 6/1991 | Zakheim et al. ............. 241/172 |
| 5,026,427 A | 6/1991 | Mitchell et al. ............... 106/23 |
| 5,047,294 A | 9/1991 | Schwab et al. ............. 428/432.1 |
| 5,085,698 A | 2/1992 | Ma et al. ..................... 106/20 |
| 5,281,655 A | 1/1994 | Mitsuji et al. ............... 524/507 |
| 5,310,778 A | 5/1994 | Shor et al. .................. 524/556 |
| 5,679,138 A | 10/1997 | Bishop et al. ............... 106/20 |
| 5,746,818 A | 5/1998 | Yatake ..................... 106/31.86 |
| 5,760,123 A | 6/1998 | Vogt-Birnbrich et al. ..... 524/500 |
| 5,804,647 A | 9/1998 | Nachtkamp et al. ......... 524/591 |
| 5,891,231 A | 4/1999 | Gnerlich et al. .......... 106/31.86 |
| 5,969,002 A | 10/1999 | Kijlstra et al. ............... 523/160 |
| 5,976,232 A | 11/1999 | Gore ........................ 106/31.65 |

(Continued)

FOREIGN PATENT DOCUMENTS

| | | |
|---|---|---|
| EP | 1 209 180 A | 5/2002 |
| EP | 1 258 510 A1 | 11/2002 |

(Continued)

OTHER PUBLICATIONS

ISR and WO of the ISA, European Patent Office, Rijswijk, NL, NL, Sita Camara, Authorized Officer [ISR] and European Patent Office, Munich, DE, Sylvie Scheuer, Authorized Officer [WO of the ISA], in PCT/US2008/086123, PCT counterpart of the present application, Apr. 24, 2009.

ISR and WO of the ISA, European Patent Office, Rijswijk, NL, Damiano Vizzini, Authorized Officer [ISR], European Patent Office, Munich, DE, Wojciech Zeslawski [WO of the ISA], Authorized Officer,both PCT/US2009/044968, in PCT counterpart of copending U.S. Appl. No. 12/989,079, Aug. 13, 2009.

ISR and WO of the ISA, European Patent Office, Rijswijk, NL, Sita Camara, Authorized Officer [ISR] and Ute Neugebauer, Authorized Officer [WO of the ISA], in PCT/US2008/086114, PCT counterpart of copending U.S. Appl. No. 12/327,194, filed Jun. 3, 2009.

(Continued)

*Primary Examiner* — Patrick Niland
(74) *Attorney, Agent, or Firm* — John H. Lamming; Simon L. Xu

(57) ABSTRACT

The present invention relates to urea-terminated polyurethanes dispersants based on diols and polyether diols, aqueous dispersions of such polyurethanes, the manufacture of the urea terminated polyurethane dispersions and inks containing pigments and/or disperse dyes dispersed with these urea terminated polyurethane dispersants. The urea termination can have nonionic hydrophilic substituents.

17 Claims, No Drawings

(56) References Cited

U.S. PATENT DOCUMENTS

| | | | |
|---|---|---|---|
| 5,990,245 A | 11/1999 | Esselborn et al. | 525/330.6 |
| 6,046,295 A | 4/2000 | Frisch, Jr. et al. | 528/28 |
| 6,248,839 B1 | 6/2001 | Esselborn et al. | 525/329.7 |
| 6,316,586 B1 | 11/2001 | Sunkara et al. | 528/300 |
| 6,433,072 B1 | 8/2002 | Gobel et al. | 524/591 |
| 6,440,203 B2 | 8/2002 | Kato | 106/31.6 |
| 6,450,632 B1 | 9/2002 | Tsang et al. | 347/96 |
| 6,608,168 B1 | 8/2003 | Ng | 528/272 |
| 6,852,156 B2 | 2/2005 | Yeh et al. | 106/31.6 |
| 6,852,823 B2 | 2/2005 | Sunkara et al. | 528/61 |
| 6,908,185 B2 | 6/2005 | Chen et al. | 347/96 |
| 6,946,539 B2 | 9/2005 | Sunkara | 528/76 |
| 7,176,248 B2 | 2/2007 | Valentini et al. | 523/160 |
| 2001/0012574 A1 | 8/2001 | Matsubayashi et al. | 428/694 |
| 2002/0044185 A1 | 4/2002 | Koitabashi et al. | 347/98 |
| 2003/0089277 A1 | 5/2003 | Zakheim et al. | 106/401 |
| 2003/0160851 A1 | 8/2003 | Baccay et al. | 347/101 |
| 2003/0184629 A1 | 10/2003 | Valentini et al. | 347/100 |
| 2004/0092622 A1 | 5/2004 | Pearlstine et al. | 523/160 |
| 2004/0176530 A1 | 9/2004 | Tielemans et al. | 524/589 |
| 2004/0201658 A1 | 10/2004 | Jackson et al. | 347/100 |
| 2004/0229976 A1 | 11/2004 | Kakiuchi et al. | 523/160 |
| 2004/0249061 A1 | 12/2004 | Sunkara et al. | 524/589 |
| 2005/0018154 A1 | 1/2005 | Box et al. | 355/30 |
| 2005/0090599 A1 | 4/2005 | Spinelli | 524/543 |
| 2005/0137375 A1 | 6/2005 | Hansen et al. | 528/44 |
| 2005/0176848 A1 | 8/2005 | Chen et al. | 528/160 |
| 2005/0176921 A1 | 8/2005 | Sunkara et al. | 528/279 |
| 2005/0182154 A1 | 8/2005 | Berge et al. | 523/160 |
| 2005/0215663 A1 | 9/2005 | Berge et al. | 523/160 |
| 2006/0119679 A1 | 6/2006 | Kruger et al. | 347/100 |
| 2006/0183852 A1 | 8/2006 | Liu et al. | 524/591 |
| 2007/0129524 A1 | 6/2007 | Sunkara | 528/44 |
| 2007/0259989 A1 | 11/2007 | Berge et al. | 523/160 |
| 2008/0039582 A1 | 2/2008 | Sunkara et al. | 524/840 |
| 2008/0175875 A1 | 7/2008 | Sunkara et al. | 424/401 |
| 2009/0259012 A1* | 10/2009 | Roberts | 528/66 |
| 2010/0143589 A1* | 6/2010 | Spinelli et al. | 427/256 |
| 2011/0039028 A1* | 2/2011 | Spinelli et al. | 427/256 |
| 2011/0060102 A1* | 3/2011 | Li et al. | 524/591 |
| 2011/0065861 A1* | 3/2011 | Li et al. | 524/591 |

FOREIGN PATENT DOCUMENTS

| | | |
|---|---|---|
| EP | 1454968 A1 * | 9/2004 |
| EP | 1 167 466 B1 | 12/2004 |
| WO | WO 00/24836 A1 | 5/2000 |
| WO | WO 2005/071026 A1 | 8/2005 |
| WO | WO 2006/027544 A1 | 3/2006 |

OTHER PUBLICATIONS

ISR and WO of the ISA, European Patent Office, Rijswijk, NL, Sita Camara, Authorized Officer [ISR] and European Patent Office, Munich, DE, Frank Heidenhain, Authorized Officer [WO of the ISA], in PCT/US2009/045008, PCT counterpart of copending U.S. Appl. No. 12/990,959, filed Aug. 14, 2009.

ISR and WO of the ISR, European Patent Office, Rijswijk, NL, Jolanda Zurkinden, Authorized Officer [ISR], European Patent Office, Munich, DE, Wojciech Zeslawski, Authorized Officer [WO of the ISA], in PCT/US2008/086130, PCT counterpart of copending U.S. Appl. No. 12/328,110, filed Mar. 11, 2009.

ISR and WO of the ISA, European Patent Office, Rijswijk, NL, Laurent Tissot, Authorized Officer [ISR], European Patent Office, Munich, DE, Frank Heidenhain, Authorized Officer [WO of the ISA], in PCT/US2009/044994, PCT counterpart of copending U.S. Appl. No. 12/990,954, filed Aug. 4, 2009.

Ralph D. Nelson, Jr., Dispersion of Powders in Liquids, Kirk-Othmer Encyclopedia of Chemical Technology, John Wiley & Sons, 2002.

S.V. Conjeevaram et al., Block Copolyurethanes Based on Polyoxytrimethylene Glycols, Journal of Polymer Science, 23, 429-444, Wiley & Sons, 1985.

JIPO, in Japanese Patent Application No. 2010-538101, Japanese national stage counterpart to the present application, Official Notice of Rejection, May 10, 2013, English translation provided by applicant's local agent.

\* cited by examiner

UREA-TERMINATED POLYURETHANE DISPERSANTS

CROSS-REFERENCE TO RELATED APPLICATION

This application claims priority from U.S. Provisional Application Ser. No. 61/005,977 (filed Dec. 10, 2007), the disclosure of which is incorporated by reference herein for all purposes as if fully set forth.

FIELD OF THE INVENTION

The present invention relates to urea-terminated polyurethanes dispersants based on diols and polyether diols used singly or in combination. These polyurethanes dispersants are effective for dispersion of particles, especially pigment particles. Pigments dispersed with the polyurethane dispersants can be used in ink jet inks.

BACKGROUND OF THE INVENTION

Disclosed herein are novel, stable aqueous particle dispersions. The polyurethane dispersants that produce the stable aqueous particle dispersions, especially pigment dispersions, the process of making the pigment dispersions, and the use thereof in ink jet inks are also disclosed herein.

Polyurethanes are materials with a substantial range of physical and chemical properties, and are widely used in a variety of applications such as coatings, adhesives, fibers, foams and elastomers. For many of these applications the polyurethanes are used as organic solvent-based solutions. However, recently environmental concerns have caused solvent-based polyurethanes to be replaced by aqueous dispersions of polyurethanes in many applications.

Polyurethane polymers are, for the purposes of the present invention, polymers wherein the polymer backbone contains urethane linkage derived from the reaction of an isocyanate group (from, e.g., a di- or higher-functional monomeric, oligomeric and/or polymeric polyisocyanate) with a hydroxyl group (from, e.g., a di- or higher-functional monomeric, oligomeric and/or polymeric polyol). Such polymers may, in addition to the urethane linkage, also contain other isocyanate-derived linkages such as urea, as well as other types of linkages present in the polyisocyanate components and/or polyol components (such as, for example, ester and ether linkage).

Polyurethane polymers can be manufactured by a variety of well-known methods, but are often prepared by first making an isocyanate-terminated "prepolymer" from polyols, polyisocyanates and other optional compounds, then chain-extending and/or chain-terminating this prepolymer to obtain a polymer possessing an appropriate molecular weight and other properties for a desired end use. Tri- and higher-functional starting components can be utilized to impart some level of branching and/or crosslinking to the polymer structure (as opposed to simple chain extension).

Polyurethanes have been prepared from diols as disclosed in Statutory Invention Registration US H2113 H but with the limitation that the polyurethane has a hydroxyl number greater than 10 and thus the polyurethanes described are not urea terminated. Polyurethane have been prepared from polyether diols as disclosed in EP1167466, US2004/0092622 and US2003/0184629 but these polyurethanes are chain extended with di or triamines, which will result in a polyurethane which has been bridged by the di or triamine chain extension. US2004/0229976 describes the use of polyurethane resins as freely added materials in pigment-dispersed aqueous recording liquid which have at most 2.0 wt % of polyurethane urea in the polyurethane.

Polyurethanes with both monofunctional end-capping and chain extension of the polyurethane have been described in WO2006/027544.

Polyurethanes have also been prepared using polytrimethylene ether glycol (PO3G) based homo and copolymers, as disclosed in U.S. Pat. No. 6,852,823, U.S. Pat. No. 6,946,539, US2005/0176921A1, U.S. application Ser. No. 11/294,850 (filed Dec. 6, 2005), and Conjeevaram et al. (*J Polym Sci*, 23, 429, (1985)), the disclosures of which are incorporated by reference herein for all purposes as if fully set forth. The most common source of PO3G and its precursors are from biosynthetic pathways that are described in the aforementioned patents and applications. Polyurethanes derived at least in part from biosynthetic pathways are important nowadays, as they reduce our reliance on the petrochemical industry.

Aqueous dispersions of self-dispersing, ionic polyurethanes have also been proposed, for example, in U.S. Pat. No. 3,412,054 and U.S. Pat. No. 3,479,310, the disclosures of which are incorporated by reference herein for all purposes as if fully set forth. In these disclosures, ionic and/or non-ionic or potentially ionic diols are incorporated into the polyurethane polymer and, following neutralization, these polyurethane ionomers can be stably dispersed in water.

Typically, polyurethane dispersions have been made using a wide range of polymeric and low molecular weight diols, diisocyanates and hydrophilic species. The dispersion process may involve synthesis and inversion from volatile solvent such as acetone, followed by distillation to remove organic solvent components. Polyurethanes may also be synthesized in the melt phase with or without inert, non-volatile solvents such as NMP (N-methylpyrrolidone). In this case, the solvent remains in the polyurethane dispersion. Added emulsifiers/surfactants may also be beneficial to dispersion stability.

Recently, polyurethane dispersions have been extended to acrylic/polyurethane hybrids and alloys, such as disclosed in U.S. Pat. No. 5,173,526, U.S. Pat. No. 4,644,030, U.S. Pat. No. 5,488,383 and U.S. Pat. No. 5,569,705, the disclosures of which are incorporated by reference herein for all purposes as if fully set forth. This process typically involves synthesis of polyurethanes in the presence of vinylic monomers (acrylates and/or styrene) as the solvent. Following inversion to form a polyurethane dispersion, the acrylic or styrenic monomers are polymerized by addition of free radical initiator(s). Variations on this process are known in the art. Acrylic/urethane hybrid dispersions offer potential advantages to coatings and other end products, including enhanced hardness, adhesion and nearly Newtonian rheology along with lower cost, low VOC and improved manufacturing.

Polyurethane dispersions that are used as pigment dispersants have been described in U.S. Pat. No. 6,133,890. These polyurethanes are prepared with an excess of isocyanate reactive group and are limited to the presence of polyalkylene oxide components. Aqueous polyurethane dispersants have found limited use as dispersants for pigments and the like.

Therefore, there is still a need for a new class of polyurethane dispersants that can stably disperse particles, especially pigment particles, in aqueous medium, and are especially suited for use in aqueous inkjet inks. It would also be advantageous for such class of polyurethane dispersants to be capable of being derived from environmentally favorable ("green carbon") materials and of being formulated into dispersion in a convenient environmentally friendly manner.

None of the above publications disclose polyurethane dispersants derived from water dispersible urea terminated polyurethanes based on certain diols and polyether polyols which have at least 3 but less than 30 (substituted) methylene groups in the diol. It has been discovered herein that these novel polyurethanes dispersants can be used as a dispersants for pigments, especially pigments for inkjet inks, and have the forgoing unique combination of attributes.

SUMMARY OF THE INVENTION

The use of polymeric conventional dispersants is well established as a means to make stable dispersions of particles, especially pigment particles. In general, these conventional dispersants have, at least, modest water solubility and this water solubility is used as a guide to predicting dispersion stability. These dispersants are most often based on acrylate/acrylic compounds. During diligent searching for new, improved polymeric dispersants, a new class of dispersants has been found that are based on urea terminated polyurethanes, where the predominant isocyanate reactive group is a hydroxyl which is part of certain diol and/or certain polyether diols. The ionic content in these dispersants can come from isocyanate or isocyanate-reactive components that have ionic substitution.

In accordance with the invention, a new class of urea terminated polyurethane dispersants has been found that produce stable aqueous dispersions. When these dispersions are utilized for ink jet inks, images printed with the ink display both improved optical density and durability.

Accordingly, there are provided herein dispersants, namely urea terminated polyurethane dispersants, that lead to stable aqueous dispersions, stable aqueous dispersions containing these polyurethane dispersants, methods of making urea terminated polyurethane dispersants, inks based on urea terminated polyurethane dispersants, inks sets comprising at least one ink based on an urea terminated polyurethane dispersants, and methods of ink jet printing that use the inks based on urea terminated polyurethane dispersants.

An aqueous particle dispersion comprising a particle and an urea terminated polyurethane ionic dispersant in an aqueous vehicle, wherein:

(a) the ionic dispersant is physically adsorbed to the particle,
(b) the polymeric ionic dispersant stably disperses the pigment in the aqueous vehicle,
(c) the average particle size of the dispersion is less than about 300 nm,
where
the urea terminated polyurethane dispersant comprises at least one compound of the general structure (I):

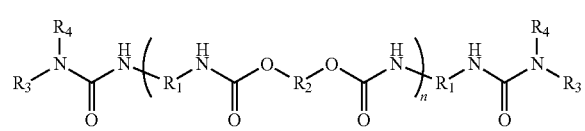

$R_1$=alkyl, substituted alkyl, substituted alkyl/aryl from a diisocyanate,
$R_2$=alkyl, substituted/branched alkyl from a diol,
$R_3$=ahydrogen; alkyl; a non-isocyanate reactive substituted, isocyanate reactive substituted, or branched alkyl from the amine terminating group;
$R_4$=hydrogen; alkyl; a non-isocyanate reactive substituted, isocyanate reactive substituted, or branched alkyl from the amine terminating group;
where the isocyanate reactive group is selected from hydroxyl, carboxyl, mercapto, or amido;
n=2 to 30;
and where $R_2$=$Z_1$ or $Z_2$ and at least one $Z_1$ and at least one $Z_2$ must be present in the polyurethane composition:

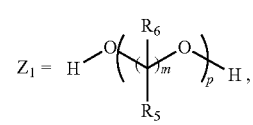

p greater than or equal to 1,
when p=1, m greater than or equal to 3 to about 30,
when p=2 or greater, m greater than or equal to 3 to about 12;
$R_5$, $R_6$=hydrogen, alkyl, substituted alkyl, aryl; where the $R_5$ is the same or different with each $R_5$ and $R_6$ substituted methylene group where $R_5$ and $R_5$ or $R_6$ can be joined to form a cyclic structure;
$Z_2$ is a diol substituted with an ionic group;
wherein the urea content of the urea-terminated polyurethane of general structure (I) is at least 2 wt % of the polyurethane and at most about 14 wt % of the polyurethane,
and the colorant is selected from pigments and disperse dyes or combinations of pigments and disperse dyes.

Structure I denotes the urea terminating component and Structure II denotes the diol and/or a polyether diol that is a building block for Structure I.

In one aspect of the present invention, there is provided a pigmented ink comprising an aqueous carrier medium and particles of pigment stabilized by a polyurethane dispersant comprising a urea-terminated polyurethane, where the urea-terminated polyurethane dispersant comprises at least one compound of the general structure (I).

The present invention also provides aqueous dispersions, preferably colorant dispersions, with urea-terminated polyurethane (as described above) dispersed particles comprising a continuous phase comprising water, and a dispersed phase comprising the water-dispersed particle.

The present invention further provides an aqueous polyurethane dispersant composition comprising a urea-terminated polyurethane as generally set forth above, wherein the polyurethane contains a sufficient amount of ionic functionality in order to render the polyurethane dispersed particles dispersible in the continuous phase of the dispersion. Preferably, the polyurethane dispersant is an ionically-stabilized polyurethane polymer.

The invention also relates to a method of preparing a stable dispersion of particles such as pharmaceuticals and colorants. The first step in the preparation is preparing an aqueous dispersion of an aqueous urea terminated polyurethane composition comprising the steps:

(a) providing reactants comprising (i) at least one diol $Z_1$ ii) at least one polyisocyanate component comprising a diisocyanate, and (iii) at least one hydrophilic reactant comprising at least one isocyanate reactive ingredient containing an ionic group, $Z_2$;
(b) contacting (i), (ii) and (iii) in the presence of a water-miscible organic solvent to form an isocyanate-functional polyurethane prepolymer;
(c) adding water to form an aqueous dispersion; and (d) prior to, concurrently with or subsequent to step (c), chain-terminating the isocyanate-functional prepolymer with a primary or secondary amine The diol, diisocyanate and hydrophilic reactant may be added together in any order.

The chain terminating amine is typically added prior to addition of water in an amount to react with substantially any remaining isocyanate functionality. The chain terminating amine is preferably a nonionic secondary amine.

If the hydrophilic reactant contains ionizable groups then, at the time of addition of water (step (c)), the ionizable groups must be ionized by adding acid or base (depending on the type of ionizable group) in an amount such that the polyurethane can be stably dispersed.

Preferably, at some point during the reaction (generally after addition of water and after chain extension), the organic solvent is substantially removed under vacuum to produce an essentially solvent-free dispersion.

After the polyurethane dispersion is prepared it is used in the dispersion of particles by known dispersion techniques.

In accordance with another aspect of the present invention, there is provided an aqueous colored ink jet ink comprising an aqueous colorant dispersion as described above, having from about 0.1 to about 10 wt % pigment based on the total weight of the ink, a weight ratio of colorant to polyurethane dispersant of from about 0.5 to about 6, a surface tension in the range of about 20 dyne/cm to about 70 dyne/cm at 25° C., and a viscosity of lower than about 30 cP at 25° C.

In still another aspect of the present invention, there is provided an ink set comprising at least one cyan ink, at least one magenta ink and at least one yellow ink, wherein at least one of the inks is an aqueous pigmented ink jet ink as set forth above and described in further detail below.

The continuous phase of the aqueous dispersion, in addition to water, may further comprise water-miscible organic solvent. A preferred level of organic solvent is from about 0 wt % to about 30 wt %, based on the weight of the continuous phase.

The dispersed phase of the aqueous dispersion is preferably from about 0.5 wt % to about 30 wt % of the total weight of the dispersion.

The polyurethane dispersants are in of themselves aqueous dispersions of urea terminated polyurethanes based on diols and polyether diols shown in Structure II above. These polyurethane dispersants potentially offer a novel and unique balance of properties including improved dispersibility, hydrophilicity, flexibility, and toughness. These properties can impart new improved to the particles the polyurethanes disperse. Also improved dispersion processes can be the result of these new urea terminated polyurethanes. The use of these polyether diols in the urea terminated polyurethane provides improved water resistance and lower melting point compared to polyethylene glycol (PEG). These urea terminated polyurethane dispersant compositions are more flexible, more dispersible and have improved interactions with pigments and other components than polyurethanes derived from polyethyene glycol (PEG). For the polyurethane (PUD) aqueous dispersions, the use of the urea-terminated polyurethane dispersant with diols and polyether diols (Structure II) also offers new balance of properties.

These polyurethane dispersants are effective dispersants for pigments, pharmaceuticals and other small particles.

DETAILED DESCRIPTION OF THE PREFERRED EMBODIMENTS

All publications, patent applications, patents and other references mentioned herein, if not otherwise indicated, are incorporated by reference herein for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

Urea-Terminated Polyurethanes Dispersants

The polyurethane dispersant is a urea terminated polyurethane of the Structure I).

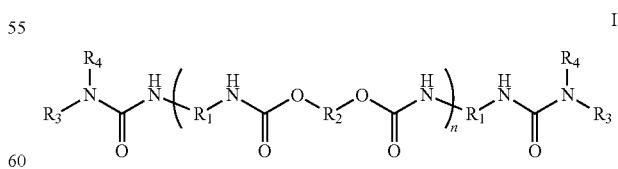

I $R_1$=alkyl, substituted alkyl, substituted alkyl/aryl from a diisocyanate, $R_2$=alkyl, substituted/branched alkyl from a diol, $R_3$=ahydrogen; alkyl; a non-isocyanate reactive substituted, isocyanate reactive substituted, or branched alkyl from the amine terminating group;

R₄=hydrogen; alkyl; a non-isocyanate reactive substituted, isocyanate reactive substituted, or branched alkyl from the amine terminating group;

where the isocyanate reactive group is selected from hydroxyl, carboxyl, mercapto, or amido;

n=2 to 30;

and where $R_2=Z_1$ or $Z_2$ and at least one $Z_1$ and at least one $Z_2$ must be present in the polyurethane composition:

II

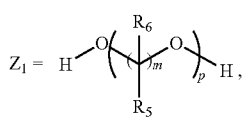

p greater than or equal to 1, when p=1, m greater than or equal to 3 to about 30, when p=2 or greater, m greater than or equal to 3 to about 12;

$R_5$, $R_6$=hydrogen, alkyl, substituted alkyl, aryl; where the $R_5$ is the same or different with each $R_5$ and $R_6$ substituted methylene group where $R_5$ and $R_5$ or $R_6$ can be joined to form a cyclic structure;

$Z_2$ is a diol substituted with an ionic group;

wherein the urea content of the urea-terminated polyurethane is at least 2 wt % of the polyurethane and at most about 14 wt % of the polyurethane, and the colorant is selected from pigments and disperse dyes or combinations of pigments and disperse dyes Structure I denotes the urea terminated polyurethane dispersant and Structure II denotes the diol and polyether diol that is a building block for Structure I. When p is 1 a diol is the primary isocyanate reactive group and when p is greater than one the diol is characterized as a polyether diol.

The invention also relates to a method of preparing a stable dispersion of particles such as pharmaceuticals and colorants, especially pigments. The first step in the preparation is preparing an aqueous dispersion of an aqueous urea terminated polyurethane comprising the steps:

(a) providing reactants comprising (i) at least one diol $Z_1$ ii) at least one polyisocyanate component comprising a diisocyanate, and (iii) at least one hydrophilic reactant comprising at least one isocyanate reactive ingredient containing an ionic group, $Z_2$;

(b) reacting (i), (ii) and (iii) in the presence of a water-miscible organic solvent to form an isocyanate-functional polyurethane prepolymer;

(c) adding water to form an aqueous dispersion; and (d) prior to, concurrently with or subsequent to step (c), chain-terminating the isocyanate-functional prepolymer with a primary or secondary amine The chain terminating amine is typically added prior to addition of water in an amount to react with substantially any remaining isocyanate functionality. The chain terminating amine is preferably a nonionic secondary amine.

The diol, diisocyanate and hydrophilic reactant may be added together in any order.

If the hydrophilic reactant contains ionizable groups then, at the time of addition of water (step (c)), the ionizable groups must be ionized by adding acid or base (depending on the type of ionizable group) in an amount such that the polyurethane can be stably dispersed.

Preferably, at some point during the reaction (generally after addition of water and after chain extension), the organic solvent is substantially removed under vacuum to produce an essentially solvent-free dispersion.

After the polyurethane dispersion is prepared it is used in the dispersion of particles by known dispersion techniques. The key features of the polyurethane dispersant are the diol and/or polyether diol and the monofunctional amine which results in the urea termination. Without being bound by theory, these polyurethanes dispersants perform better as dispersants for pigments etc. Also, the diol and/or polyether diol/urea termination combination seems to produce a relatively pure polyurethane that does not have contamination and/or extensive crosslinking that can lead to poorer performance dispersing pigments and other particles.

The urea-terminated polyurethanes are dispersants for particles, such as pigments. In this case, the polyurethane is either 1) utilized as a dissolved polyurethane in a compatible solvent where the initial polyurethane/particle mixture is prepared and then processed using dispersion equipment to produce the aqueous polyurethane dispersed particle; or 2) the polyurethane dispersion and the particle dispersed are mixed in a compatible solvent system which, in turn is processed using dispersion equipment to produce the aqueous polyurethane dispersed particle where the polyurethane is the dispersant.

It should be understood that the process of used to prepare the polyurethane generally results in a urea-terminated polyurethane polymer of the above structure being present in the final product. However, it is understood that the final product will typically be a mixture of products, of which a portion is the above urea terminated polyurethane polymer, the other portion being a normal distribution of other polymer products and may contain varying ratios of unreacted monomers. The heterogeneity of the resultant polymer will depend on the reactants selected and reactant conditions chosen, as will be apparent to those skilled in the art.

A preferred use of the urea terminated polyurethane dispersants is to make ink jet ink with dispersed colorants, especially pigments. Optional formulation parameters for the ink jet inks include:

a) the polyurethane dispersant where a polyether diol of Structure II which is at least 50 weight percent of the polyether diol;

b) the polyurethane dispersant where a polyether diol of Structure II which has a number average molecular weight of 200 to 5000.

c) the polyurethane dispersant where a polyether diol of Structure II which has m=3 or 4.

d) the polyurethane dispersant where R5 and R6 of the polyurethane dispersant are hydrogen.

e) the polyurethane dispersant where the polyether diol of Structure II m=3 and the ether is group is derived from biological sources.

f) the polyurethane dispersant where Groups R3 and R4 of the polyurethane dispersant are substituted with nonionic hydrophilic groups.

g) the polyurethane dispersant where Groups R3 and R4 of the polyurethane dispersant are methoxyethyl.

h). d) the polyurethane dispersant where Groups R3 and R4 of the polyurethane dispersant are alkyl.

Diol and Polyether Diol Component

The diol component can either be based on alpha, omega dialcohol or diols (p=1) with at least 3 methylene groups and less than or equal to 30 methylene groups (m=3 to about 30) or a polyether diol (p is greater than 1) with 3 to 12 methylene groups (m=3 to about 12). The diol and polyether diol can be used separately or in mixtures. The amount of diol:polyether diol ranges from 0:100 to 100:0.

In one embodiment, the diol and/or polyether diol shown in Structure (II) may be blended with other oligomeric and/or polymer polyfunctional isocyanate-reactive compounds such as, for example, polyols, polyamines, polythiols, polythioamines, polyhydroxythiols and polyhydroxylamines. When blended, it is preferred to use di-functional components and, more preferably, one or more diols including, for example, polyether diols, polyester diols, polycarbonate diols, polyacrylate diols, polyolefin diols and silicone diols.

When p is greater than 1 the polyether diol shown in Structure (II) are oligomers and polymers in which at least 50% of the repeating units have 3 to 12 methylene groups in the ether chemical groups. More preferably from about 75% to 100%, still more preferably from about 90% to 100%, and even more preferably from about 99% to 100%, of the repeating units are 3 to 12 methylene groups in the ether chemical groups (in Structure (II) m=3-12). The preferable number of methylene groups are 3 or 4. The polyether diol shown in Structure (II) can be prepared by polycondensation of monomers comprising alpha, omega diols where m=3-12, thus resulting in polymers or copolymers containing the structural linkage shown above. As indicated above, at least 50% of the repeating units are 3 to 12 methylene ether units.

The oligomers and polymers based on the polyether diol {where p is greater than 1} shown in Structure (II), have from 2 to about 50 of the ether diol repeating groups shown in Structure (II); more preferable about 5 to about 20 of the ether diol repeating groups shown in Structure (II), where p denotes the number of repeating groups. In structure (II) $R_5$ and $R_6$ are hydrogen, alkyl, substituted alkyl, aryl; where the $R_5$ and $R_6$ are the same or different with each substituted methylene group and where $R_5$ and $R_6$ can be joined to form a cyclic structure. The substituted alkyl group preferably does not contain isocyanate reactive groups except as described below where a limited amount of trihydric alcohols can be allowed. In general, the substituted alkyls are intended to be inert during the polyurethane preparation.

In addition to the 3 to 12 methylene ether units, lesser amounts of other units, such as other polyalkylene ether repeating units derived from ethylene oxide and propylene oxide may be present. The amount of the ethylene glycols and 1,2-propylene glycols which are derived from epoxides such as ethylene oxide, propylene oxide, butylene oxide, etc are limited to less than 10% of the total polyether diol weight. A preferred polyether diol is derived from 1,3-propanediol. The employed PO3G may be obtained by any of the various well known chemical routes or by biochemical transformation routes. Preferably, the 1,3-propanediol is obtained biochemically from a renewable source ("biologically-derived" 1,3-propanediol). The description of this biochemically obtained 1,3-propanediol can be found co-owned and co-pending U.S. patent application Ser. No. 11/782,098 (filed Jul. 24, 2007), the disclosure of which is incorporated by reference herein for all purposes as if fully set forth For the diol of Structure (II) (p=1) the biochemically derived material described above is the preferred 1,3-propanediol.

The starting material for making the diol will depend on the desired polyether diol of Structure II (p is greater than 1), availability of starting materials, catalysts, equipment, etc., and comprises "1,3 to 1,12-diol reactant." By "1,3 to 1,12-diol reactant" is meant 1,3 to 1,12-diol, and oligomers and prepolymers of 1,3 to 1,12-diol preferably having a degree of polymerization of 2 to 50, and mixtures thereof. In some instances, it may be desirable to use up to 10% or more of low molecular weight oligomers where they are available. Thus, preferably the starting material comprises 1,3 to 1,12-diol and the dimer and trimer thereof. A particularly preferred starting material is comprised of about 90% by weight or more 1,3 to 1,12-diol, and more preferably 99% by weight or more 1,3 to 1,12-diol, based on the weight of the 1,3 to 1,12-diol reactant.

As indicated above, the polyether diol shown in Structure (II) (p greater than 1) may contain lesser amounts of other polyalkylene ether repeating units in addition to the 3-12 methylene ether units. The monomers for use in preparing poly(3-12)methylene ether glycol can, therefore, contain up to 50% by weight (preferably about 20 wt % or less, more preferably about 10 wt % or less, and still more preferably about 2 wt % or less), of comonomer diols in addition to the 1,3-propanediol reactant. Comonomer diols that are suitable for use in the process include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol; cycloaliphatic diols, for example, 1,4-cyclohexanediol, 1,4-cyclohexanedimethanol and isosorbide; and polyhydroxy compounds, for example, glycerol, trimethylolpropane, and pentaerythritol. The polyether diol shown in Structure (II) useful in practicing this invention can contain small amounts of other repeat units, for example, from aliphatic or aromatic diacids or diesters, such as described in U.S. Pat. No. 6,608,168 (the disclosure of which is incorporated by reference herein for all purposes as if fully set forth). This type of the polyether diol shown in Structure (II) can also be called a "random polymethylene ether ester", and can be prepared by polycondensation of 1,3 to 1,12-diol reactant and about 10 to about 0.1 mole % of aliphatic or aromatic diacid or esters thereof, such as terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof, and dimethyl terephthalate, bibenzoate, isophthlate, naphthalate and phthalate; and combinations thereof. Of these, terephthalic acid, dimethyl terephthalate and dimethyl isophthalate are preferred.

The preferred, the polyether diol shown in Structure (II) (p is greater than 1) for use in the invention have a number average molecular weight ($M_n$) in the range of about 200 to about 5000, and more preferably from about 240 to about 3600. Blends of the polyether diol shown in Structure (II) s can also be used. For example, the polyether diol shown in Structure (II) can comprise a blend of a higher and a lower molecular weight polyether diol shown in Structure (II) preferably wherein the higher molecular weight polyether diol shown in Structure (II) has a number average molecular weight of from about 1000 to about 5000, and the lower molecular weight, the polyether diol shown in Structure (II) has a number average molecular weight of from about 200 to about 750. The $M_n$ of the blended polyether diol shown in Structure (II) will preferably still be in the range of from about 250 to about 3600. The polyether diol shown in Structure (II) s preferred for use herein are typically polydisperse polymers having a polydispersity (i.e. $M_w/M_n$) of preferably from about 1.0 to about 2.2, more preferably from about 1.2 to about 2.2, and still more preferably from about 1.5 to about 2.1. The polydispersity can be adjusted by using blends of the polyether diol shown in Structure (II).

The polyether diol shown in Structure (II) for use in the present invention preferably have a color value of less than about 100 APHA, and more preferably less than about 50 APHA.

Other Isocyanate-Reactive Components

As indicated above, the polyether diol shown in Structure (II) may be blended with other polyfunctional isocyanate-reactive components, most notably oligomeric and/or polymeric polyols.

Suitable other diols contain at least two hydroxyl groups, and preferably have a molecular weight of from about 60 to about 6000. Of these, the polymeric other diols are best defined by the number average molecular weight, and can range from about 200 to about 6000, preferably from about 800 to about 3000, and more preferably from about 1000 to about 2500. The molecular weights can be determined by hydroxyl group analysis (OH number). An example of a suitable other diol is 1,3-dihydroxyethyl dimethyl hydantoin.

Examples of polymeric polyols include polyesters, polyethers, polycarbonates, polyacetals, poly(meth)acrylates, polyester amides, polythioethers and mixed polymers such as a polyester-polycarbonates where both ester and carbonate linkages are found in the same polymer. A combination of these polymers can also be used. For examples, a polyester polyol and a poly(meth)acrylate polyol may be used in the same polyurethane synthesis.

Suitable polyester polyols include reaction products of polyhydric, preferably dihydric alcohols to which trihydric alcohols may optionally be added, and polybasic (preferably dibasic) carboxylic acids. Trihydic alcohols are limited to at most about 2 weight % such that some branching can occur but no significant crosslinking would occur, and may be used in cases in which modest branching of the NCO prepolymer or polyurethane is desired. Instead of these polycarboxylic acids, the corresponding carboxylic acid anhydrides or polycarboxylic acid esters of lower alcohols or mixtures thereof may be used for preparing the polyesters.

The polycarboxylic acids may be aliphatic, cycloaliphatic, aromatic and/or heterocyclic or mixtures thereof and they may be substituted, for example, by halogen atoms, and/or unsaturated. The following are mentioned as examples: succinic acid; adipic acid; suberic acid; azelaic acid; sebacic acid; 1,12-dodecyldioic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate.

Preferable polyester diols for blending with the polyol shown in Structure (II) are hydroxyl terminated poly(butylene adipate), poly(butylene succinate), poly(ethylene adipate), poly(1,2-propylene adipate), poly(trimethylene adipate), poly(trimethylene succinate), polylactic acid ester diol and polycaprolactone diol. Other hydroxyl terminated polyester diols are copolyethers comprising repeat units derived from a diol and a sulfonated dicarboxylic acid and prepared as described in U.S. Pat. No. 6,316,586 (the disclosure of which is incorporated by reference herein for all purposes as if fully set forth). The preferred sulfonated dicarboxylic acid is 5-sulfo-isophthalic acid, and the preferred diol is 1,3-propanediol.

Suitable polyether polyols are obtained in a known manner by the reaction of starting compounds that contain reactive hydrogen atoms with alkylene oxides such as ethylene oxide, propylene oxide, butylene oxide, styrene oxide, tetrahydrofuran, epichlorohydrin or mixtures of these. It is preferred that the polyethers do not contain more than about 10% by weight of ethylene oxide units. More preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- and 1,1,2-tris-(hydroxylphenyl)-ethane, dimethylolpropionic acid or dimethylolbutanoic acid.

Polyethers that have been obtained by the reaction of starting compounds containing amine compounds can also be used. Examples of these polyethers as well as suitable polyhydroxy polyacetals, polyhydroxy polyacrylates, polyhydroxy polyester amides, polyhydroxy polyamides and polyhydroxy polythioethers, are disclosed in U.S. Pat. No. 4,701,480 (the disclosure of which is incorporated by reference herein for all purposes as if fully set forth).

Polycarbonates containing hydroxyl groups include those known, per se, such as the products obtained from the reaction of diols such as propanediol-(1,3), butanediol-(1,4) and/or hexanediol-(1,6), diethylene glycol, triethylene glycol or tetraethylene glycol, higher polyether diols with phosgene, diarylcarbonates such as diphenylcarbonate, dialkylcarbonates such as diethylcarbonate or with cyclic carbonates such as ethylene or propylene carbonate. Also suitable are polyester carbonates obtained from the above-mentioned polyesters or polylactones with phosgene, diaryl carbonates, dialkyl carbonates or cyclic carbonates.

Polycarbonate diols for blending are preferably selected from the group consisting of polyethylene carbonate diol, polytrimethylene carbonate diol, polybutylene carbonate diol and polyhexylene carbonate.

Poly(meth)acrylates containing hydroxyl groups include those common in the art of addition polymerization such as cationic, anionic and radical polymerization and the like. Examples are alpha-omega diols. An example of these type of diols are those which are prepared by a "living" or "control" or chain transfer polymerization processes which enables the placement of one hydroxyl group at or near the termini of the polymer. U.S. Pat. No. 6,248,839 and U.S. Pat. No. 5,990,245 (the disclosures of which are incorporated by reference herein for all purposes as if fully set forth) have examples of protocol for making terminal diols. Other di-NCO reactive poly(meth) acrylate terminal polymers can be used. An example would be end groups other than hydroxyl such as amino or thiol, and may also include mixed end groups with hydroxyl.

Polyolefin diols are available from Shell as KRATON LIQUID L and Mitsubishi Chemical as POLYTAIL H.

Silicone glycols are well known, and representative examples are described in U.S. Pat. No. 4,647,643, the disclosure of which is incorporated by reference herein for all purposes as if fully set forth.

Other optional compounds for preparing the NCO prepolymer include lower molecular weight, at least difunctional NCO-reactive compounds having an average molecular weight of up to about 400. Examples include the dihydric and higher functional alcohols, which have previously been described for the preparation of the polyester polyols and polyether polyols.

In addition to the above-mentioned components, which are preferably difunctional in the isocyanate polyaddition reaction, mono-functional and even small portions of trifunctional and higher functional components generally known in polyurethane chemistry, such as trimethylolpropane or 4-isocyanantomethyl-1,8-octamethylene diisocyanate, may be used in cases in which branching of the NCO prepolymer or polyurethane is desired.

It is, however, preferred that the NCO-functional prepolymers should be substantially linear, and this may be achieved by maintaining the average functionality of the prepolymer starting components at or below 2:1.

Similar NCO reactive materials can be used as described for hydroxy containing compounds and polymers, but which contain other NCO reactive groups. Examples would be dithiols, diamines, thioamines and even hydroxythiols and hydroxylamines. These can either be compounds or polymers with the molecular weights or number average molecular weights as described for the polyols.

Chain Termination Reactant

The terminating agent is a primary or secondary monoamine which is added to make the urea termination. In Structure (I) the terminating agent is shown as $R_3(R_4)N$— substituent on the polyurethane. The substitution pattern for $R_3$ and $R_4$ include hydrogen, alkyl, a substituted/branched alkyl, isocyanate reactive where the substituent can be an isocyanate reactive group selected from hydroxyl, carboxyl, mercapto, amido and other ones which have less isocyanate reactivity than primary or secondary amine. At least one of the $R_3$ and $R_4$ must be other than hydrogen.

The amount of chain terminator employed should be approximately equivalent to the unreacted isocyanate groups in the prepolymer. The ratio of active hydrogens from amine in the chain terminator to isocyanate groups in the prepolymer preferably being in the range from about 1.0:1 to about 1.2:1, more preferably from about 1.0:1.1 to about 1.1:1, and still more preferably from about 1.0:1.05 to about 1.1:1, on an equivalent basis. Although any isocyanate groups that are not terminated with an amine can react with other isocyanate reactive functional group and water the ratios of chain termination to isocyanate group is chosen to assure urea termination. Amine termination of the polyurethane is avoided by the choice and amount of chain terminating agent leading to a urea terminated polyurethane which has improved molecular weight control and improved properties as a particle dispersant.

Aliphatic primary or secondary monoamines are preferred. Example of monoamines useful as chain terminators include but are not restricted to butylamine, hexylamine, 2-ethylhexyl amine, dodecyl amine, diisopropanol amine, stearyl amine, dibutyl amine, dinonyl amine, bis(2-ethylhexyl)amine, diethylamine, bis(methoxyethyl)amine, N-methylstearyl amine, diethanolamine and N-methyl aniline. A preferred isocyanate reactive chain terminator is bis(methoxyethyl) amine (BMEA). The bis(methoxyethyl)amine is part of a preferred class of urea terminating reactant where the substituents are non reactive in the isocyanate chemistry, but are nonionic hydrophilic groups. This nonionic hydrophilic group provides the urea terminated polyether diol polyurethane with more water compatible.

Any primary or secondary monoamines substituted with less isocyanate reactive groups may be used as chain terminators. Less isocyanate reactive groups could be hydroxyl, carboxyl, amide and mercapto. Example of monoamines useful as chain terminators include but are not restricted to monoethanolamine, 3-amino-1-propanol, isopropanolamine, N-ethylethanolamine, diisopropanolamine, 6-aminocaproic acid, 8-aminocaprylic acid, 3-aminoadipic acid, and lysine. Chain terminating agents may include those with two less isocyanate reactive groups such as glutamine. A preferred isocyanate reactive chain terminator is diethanolamine. The diethanolamine is part of a preferred class of urea terminating reactant where the substituents are hydroxyl functionalities which can provide improved pigment wetting. The relative reactivity of the amine versus the less isocyanate reactive group and the mole ratios of NCO and the chain terminating amine produce the urea terminated polyurethane.

The urea content of the urea-terminated polyurethane in weight percent of the polyurethane is determined by dividing the mass of chain terminator by the sum of the other polyurethane components including the chain terminating agent. The urea content is from about 0.75 wt % to about 14 wt %. The urea content is preferably from about 2.5 wt % to about 10.5 wt %. The 0.75 wt % occurs when the polyether diols used are large, for instance $M_n$ is greater than about 4000 and/or the molecular weight of the isocyanate is high.

Polyisocyanate Component

Suitable polyisocyanates are those that contain either aromatic, cycloaliphatic or aliphatic groups bound to the isocyanate groups. Mixtures of these compounds may also be used. Preferred are compounds with isocyanates bound to a cycloaliphatic or aliphatic moieties. If aromatic isocyanates are used, cycloaliphatic or aliphatic isocyanates are preferably present as well. In Structure I, $R_1$ can be preferably substituted with aliphatic groups.

Diisocyanates are preferred, and any diisocyanate useful in preparing polyurethanes and/or polyurethane-ureas from polyether glycols, diisocyanates and diols or amine can be used in this invention.

Examples of suitable diisocyanates include, but are not limited to, 2,4-toluene diisocyanate (TDI); 2,6-toluene diisocyanate; trimethyl hexamethylene diisocyanate (TMDI); 4,4'-diphenylmethane diisocyanate (MDI); 4,4'-dicyclohexylmethane diisocyanate ($H_{12}$MDI); 3,3'-dimethyl-4,4'-biphenyl diisocyanate (TODD; Dodecane diisocyanate ($C_{12}$DI); m-tetramethylene xylylene diisocyanate (TMXDI); 1,4-benzene diisocyanate; trans-cyclohexane-1,4-diisocyanate; 1,5-naphthalene diisocyanate (NDI); 1,6-hexamethylene diisocyanate (HDI); 4,6-xylyene diisocyanate; isophorone diisocyanate (IPDI); and combinations thereof. IPDI and TMXDI are preferred.

Small amounts, preferably less than about 3 wt % based on the weight of the diisocyanate, of monoisocyanates or polyisocyanates can be used in mixture with the diisocyanate. Examples of useful monoisocyanates include alkyl isocyanates such as octadecyl isocyanate and aryl isocyanates such as phenyl isocyanate. Example of a polyisocyanate are triisocyanatotoluene HDI trimer (Desmodur 3300), and polymeric MDI (Mondur MR and MRS).

Ionic Reactants

The hydrophilic reactant contains ionic and/or ionizable groups (potentially ionic groups). Preferably, these reactants will contain one or two, more preferably two, isocyanate reactive groups, as well as at least one ionic or ionizable group. In the structural description of the urea terminated polyether polyurethane described herein the reactant containing the ionic group is designated as $Z_2$.

Examples of ionic dispersing groups include carboxylate groups (—COOM), phosphate groups (—OPO$_3$M$_2$), phosphonate groups (—PO$_3$M$_2$), sulfonate groups (—SO$_3$M), quaternary ammonium groups (—NR$_3$Y, wherein Y is a monovalent anion such as chlorine or hydroxyl), or any other effective ionic group. M is a cation such as a monovalent metal ion (e.g., Na$^+$, K$^+$, Li$^+$, etc.), H$^+$, NR$_4^+$, and each R can be independently an alkyl, aralkyl, aryl, or hydrogen. These ionic dispersing groups are typically located pendant from the polyurethane backbone.

The ionizable groups in general correspond to the ionic groups, except they are in the acid (such as carboxyl —COOH) or base (such as primary, secondary or tertiary amine —NH$_2$, —NRH, or —NR$_2$) form. The ionizable groups are such that they are readily converted to their ionic form during the dispersion/polymer preparation process as discussed below.

The ionic or potentially ionic groups are chemically incorporated into the polyurethane in an amount to provide an ionic group content (with neutralization as needed) sufficient to render the polyurethane dispersible in the aqueous medium of the dispersion. Typical ionic group content will range from about 10 up to about 210 milliequivalents (meq), preferably from about 20 to about 140 meq., per 100 g of polyurethane, and most preferably less than about 90 meq per 100 g of urea terminated polyurethane.

Suitable compounds for incorporating these groups include (1) monoisocyanates or diisocyanates which contain ionic and/or ionizable groups, and (2) compounds which contain both isocyanate reactive groups and ionic and/or ionizable groups. In the context of this disclosure, the term "isocyanate reactive groups" is taken to include groups well known to those of ordinary skill in the relevant art to react with isocyanates, and preferably hydroxyl, primary amino and secondary amino groups.

Examples of isocyanates that contain ionic or potentially ionic groups are sulfonated toluene diisocyanate and sulfonated diphenylmethanediisocyanate.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are preferred. Preferred examples of anionic groups include carboxylate and sulfonate groups. Preferred examples of cationic groups include quaternary ammonium groups and sulfonium groups.

The neutralizing agents for converting the ionizable groups to ionic groups are described in the preceding incorporated publications, and are also discussed hereinafter. Within the context of this invention, the term "neutralizing agents" is meant to embrace all types of agents that are useful for converting ionizable groups to the more hydrophilic ionic (salt) groups.

In the case of anionic group substitution, the groups can be carboxylic acid groups, carboxylate groups, sulphonic acid groups, sulphonate groups, phosphoric acid groups and phosphonate groups, The acid salts are formed by neutralizing the corresponding acid groups either prior to, during or after formation of the NCO prepolymer, preferably after formation of the NCO prepolymer.

Suitable compounds for incorporating carboxyl groups are described in U.S. Pat. No. 3,479,310, U.S. Pat. No. 4,108,814 and U.S. Pat. No. 4,408,008, the disclosures of which are incorporated by reference herein for all purposes as if fully set forth. The neutralizing agents for converting the carboxylic acid groups to carboxylate salt groups are described in the preceding incorporated publications, and are also discussed hereinafter. Within the context of this invention, the term "neutralizing agents" is meant to embrace all types of agents that are useful for converting carboxylic acid groups to the more hydrophilic carboxylate salt groups. In like manner, sulphonic acid groups, sulphonate groups, phosphoric acid groups, and phosphonate groups can be neutralized with similar compounds to their more hydrophilic salt form.

Examples of carboxylic group-containing compounds are the hydroxy-carboxylic acids corresponding to the structure $(HO)_xQ(COOH)_y$ wherein Q represents a straight or branched, hydrocarbon radical containing 1 to 12 carbon atoms, x is 1 or 2 (preferably 2), and y is 1 to 3 (preferably 1 or 2).

Examples of these hydroxy-carboxylic acids include citric acid, tartaric acid and hydroxypivalic acid.

Especially preferred acids are those of the above-mentioned structure wherein x=2 and y=1. These dihydroxy alkanoic acids are described in U.S. Pat. No. 3,412,054, the disclosure of which is incorporated by reference herein for all purposes as if fully set forth. Especially preferred dihydroxy alkanoic acids are the alpha,alpha-dimethylol alkanoic acids represented by the Structure (III): wherein Q' is hydrogen

or an alkyl group containing 1 to 8 carbon atoms. The most preferred compound is alpha,alpha-dimethylol propionic acid, i.e., wherein Q' is methyl in the above formula. These dihydroxy alkanoic acids are described in U.S. Pat. No. 3,412,054, the disclosure of which is incorporated by reference herein for all purposes as if fully set forth. The preferred group of dihydroxy alkanoic acids are the α,α-dimethylol alkanoic acids represented by the structure $R^7C-(CH_2OH)_2-COOH$, wherein $R^7$ is hydrogen or an alkyl group containing 1 to 8 carbon atoms. Examples of these ionizable diols include but are not limited to dimethylolacetic acid, 2,2'-dimethylolbutanoic acid, 2,2'-dimethylolpropionic acid, and 2,2'-dimethylolbutyric acid. The most preferred dihydroxy alkanoic acids is 2,2'-dimethylolpropionic acid ("DMPA"). Suitable carboxylates also include $H_2N-(CH_2)_4-CH(CO_2H)-NH_2$, and $H_2N-CH_2-CH_2-NH-CH_2-CH_2-CO_2Na$ When the ionic stabilizing groups are acids, the acid groups are incorporated in an amount sufficient to provide an acid group content for the urea-terminated polyurethane, known by those skilled in the art as acid number (mg KOH per gram solid polymer), of at least about 6, preferably at least about 10 milligrams KOH per 1.0 gram of polyurethane and even more preferred 20 milligrams KOH per 1.0 gram of polyurethane, The upper limit for the acid number (AN) is about 120, and preferably about 90.

Suitable compounds for incorporating the previously discussed carboxylate, sulfonate and quaternary nitrogen groups are described in U.S. Pat. No. 3,479,310, U.S. Pat. No. 4,303,774 and U.S. Pat. No. 4,108,814, the disclosures of which are incorporated by reference herein for all purposes as if fully set forth.

Suitable compounds for incorporating tertiary sulfonium groups are described in U.S. Pat. No. 3,419,533, the disclosure of which is incorporated by reference herein for all purposes as if fully set froth. The neutralizing agents for converting the potentially ionic groups to ionic groups are also described in those patents. Within the context of this disclosure, the term "neutralizing agents" is meant to embrace all types of agents which are useful for converting potentially ionic or ionizable groups to ionic groups. Accordingly, this term also embraces quaternizing agents and alkylating agents.

The preferred sulfonate groups for incorporation into the polyurethanes are the diol sulfonates as disclosed in previously incorporated U.S. Pat. No. 4,108,814. Suitable diol sulfonate compounds also include hydroxyl terminated copolyethers comprising repeat units derived from a diol and a sulfonated dicarboxylic acid and prepared as described in previously incorporated U.S. Pat. No. 6,316,586. The preferred sulfonated dicarboxylic acid is 5-sulfo-isophthalic acid, and the preferred diol is 1,3-propanediol.

Suitable sulfonates also include $H_2N-CH_2-CH_2-NH-(CH_2)_r-SO_3Na$, where r=2 or 3; and $HO-CH_2-CH_2-C(SO_3Na)-CH_2-OH$. The preferred carboxylate groups for incorporation are derived from hydroxy-carboxylic acids of the general structure $((HO)_xR^8(COOH)_y)$, wherein $R^8$ represents a straight or branched hydrocarbon radical containing 1 to 12 carbon atoms, and x and y each independently represents values from 1 to 3. Examples of these hydroxy-carboxylic acids include citric acid and tartaric acid.

In addition to the foregoing, cationic centers such as tertiary amines with one alkyl and two alkylol groups may also be used as the ionic or ionizable group.

When amines are used as the neutralizing agent, the chain terminating reaction producing the urea termination is preferably completed prior to addition of a neutralizing agent that can also behave as an isocyanate reactive group.

In order to convert the preferred potential anionic groups to anionic groups either before, during or after their incorporation into the prepolymers, either volatile or nonvolatile basic materials may be used to form the counterions of the anionic groups. Volatile bases are those wherein at least about 90% of the base used to form the counterion of the anionic group volatilizes under the conditions used to remove water from the aqueous polyurethane dispersions. Nonvolatile basic materials are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Of these the trialkyl-substituted tertiary amines are preferred. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone.

Suitable nonvolatile basic materials include monovalent metals, preferably alkali metal, more preferably lithium, sodium and potassium and most preferably sodium, hydrides, hydroxides, carbonates or bicarbonates. When an acid-containing diol, for example, is used as the ionic group, a relatively mild inorganic base such as $NaHCO_3$, $Na_2(CO_3)$, NaAc (where Ac represents acetate), $NaH_2PO_4$ and the like will assist in improving the dispersion. These inorganic bases are relatively low in odor, and also tend not to be skin irritants.

When the potential cationic or anionic groups of the polyurethane are neutralized, they provide hydrophilicity to the polymer and facilitating the formation of a stable aqueous polyurethane dispersion. The neutralization steps may be conducted (1) prior to polyurethane formation by treating the component containing the potentially ionic group(s), or (2) after polyurethane formation, but prior to dispersing the polyurethane. The reaction between the neutralizing agent and the potential anionic groups may be conducted between about 20° C. and about 150° C., but is normally conducted at temperatures below about 100° C., preferably between about 30° C. and about 80° C., and more preferably between about 50° C. and about 70° C., with agitation of the reaction mixture. The ionic or potentially ionic group may be used in amount of about 2 to about 20 percent by weight solids.

The isocyanate reactive ionic reactants will preferably contain one or two, more preferably two, isocyanate reactive groups such as amino or hydroxyl groups, as well as at least one ionic or ionizable group such as carboxyl, sulfonate and tertiary ammonium salts. A preferred ionic or ionizable group is carboxyl.

The urea terminated polyurethane dispersant has a molecular weight of about 2000 to about 30,000. Preferably the molecular weight is about 3000 to 20000.

Particles to be Dispersed

A wide variety of particles may be dispersed by the inventive urea terminated polyurethane dispersant which include colorants, pharmaceuticals and other particles. The colorants include organic and inorganic pigments and disperse dyes, alone or in combination, may be dispersed with the urea terminated polyurethane dispersant to prepare an ink, especially an inkjet ink. The term "pigment" as used herein means an insoluble colorant that requires it to be dispersed with a dispersant and processed under dispersive conditions with the dispersant present. The dispersion process results in a stable dispersed pigment.

The pigment used with the inventive urea terminated polyurethane dispersants do not include self-dispersed pigments.

The polyurethane dispersed pigment particles are sufficiently small to permit free flow of the ink through the ink jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is less than about 500 nm, preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in previously incorporated U.S. Pat. No. 5,085,698.

In the case of organic pigments, the ink may contain up to approximately 30%, preferably about 0.1 to about 25%, and more preferably about 0.25 to about 10%, pigment by weight based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments.

The urea terminated polyurethane polymer dispersant is preferably present in the range of about 0.1 to about 20%, more preferably in the range of about 0.2 to about 10%, and still more preferably in the range of about 0.25% to about 5%, by weight based on the weight of the total dispersion composition.

When the ionic content is low, less than about 90 meq per 100 g of polyurethane, the urea terminated polyurethane dispersants have low salt stability. This low salt stability is associated with the phenomena that the pigment in the inkjet ink will crash out onto the surface of a substrate, especially paper and produce a high optical density. The optical density is similar to what has been obtained with self-dispersed pigments like those described in U.S. Pat. No. 6,852,156. This document is incorporated by reference herein for all purposes as if fully set forth.

A new class of low salt stability polymeric dispersants was described in US2005/0090599. This document is incorporated by reference herein for all purposes as if fully set forth. The inventive urea terminated polyurethanes when they have an ionic content of less than about 90 meq per 100 g of polyurethane, also have this characteristic property. That is, the pigment dispersion with the inventive urea terminated polyurethanes have low salt stability. When the pigment dispersion is tested with salt solutions as described in US2005/0090599 the urea terminated polyurethane dispersed pigment will precipitate out of solution. The pigment dispersion with the inventive urea terminated polyurethanes will precipitate out of solution with salt solutions of less than 0.16 molar salt.

Unexpectedly, the urea terminated polyurethane dispersed pigment when they have a ionic content of less than about 90 meq per 100 g of polyurethane gives improved optical density relative to pigment dispersed with acrylic and acrylate-based dispersants, but also give improved Distinctness of Image (DOI) and improved gloss. This is a surprisingly good result, with the aforementioned pigmented inks utilizing acrylic dispersants for ink jet inks, there is an optical density/gloss (or DOI) tradeoff. The inventive inks produce color intensity, gloss and DOI with a significantly better balance of performance than the pigmented inks with acrylic dispersants. Furthermore with the optical properties the inventive inks rival inks made from dyes. The printed inventive inks have significantly improved durability relative to dye inks.

Mixtures of urea terminated polyurethane dispersants may be used for dispersing particles. Also, mixtures of urea terminated polyurethane dispersant with other commonly used dispersants may be used.

Polyurethane and Polyurethane Dispersion Preparation

The process of preparing the dispersions of the invention begins with preparation of the polyurethane, which can be prepared by mixture or stepwise methods. The preferred physical form of the polyurethane is as a dispersion. These urea-terminated polyether polyurethanes can behave as a dispersant for a particle, such as a pigment. In this case, the polyurethane is either 1.) utilized as a dissolved polyurethane in a compatible solvent where the initial polyurethane/particle mixture is prepared and then processed using dispersion equipment to produce the polyurethane dispersed particle; or 2) the polyurethane dispersion and the particle dispersed are mixed in a compatible solvent system which, in turn is processed using dispersion equipment to produce the polyurethane dispersed particle.

In the mixture process for preparing the urea terminated polyurethane, a isocyanate terminated polyurethane is prepared by mixing the polyol of Structure (II), the ionic reactant, up to 50% other diols, and solvent, and then adding diisocyanate to the mixture. This reaction is conducted at from about 40° C. to about 100° C., and more preferably from about 50° C. to about 90° C. The preferred ratio of isocyanate to isocyanate reactive groups is from about 1.3:1 to about 1.05:1, and more preferably from about 1.25:1 to about 1.1:1. This isocyanate terminated polyurethane is often called a polyurethane prepolymer prior to the reaction with the chain terminating agent. When the targeted percent isocyanate is reached, then the primary or secondary amine chain terminator is added, and then base or acid is added to neutralize ionizable moieties incorporated from the ionizable reagent. The polyurethane solution is then converted to an aqueous polyurethane dispersion via the addition of water under high shear. If present, the volatile solvent can be distilled under reduced pressure or other means.

If some cases, addition of neutralization agent, preferably tertiary amines, may be beneficial added during early stages of the polyurethane synthesis. Alternately, advantages may be achieved via the addition of the neutralization agent, preferably alkali base, simultaneously along with the water of inversion at high shear.

In the stepwise method, isocyanate terminated polyurethane is prepared by dissolving the ionic reactant in solvent, and then adding diisocyanate to the mixture. Once the initial percent isocyanate target is reached, the polyol component is added. This reaction is conducted at from about 40° C. to about 100° C., and more preferably from about 50° C. to about 90° C. The preferred ratio of isocyanate to isocyanate reactive groups is from about 1.3:1 to about 1.05:1, and more preferably from about 1.25:1 to about 1.1:1. Alternately, the diols and/or polyether polyols and up to 50% other diols may be reacted in the first step, and the ionic reactant may be added after the initial percent isocyanate target is reached. When the final targeted percent isocyanate is reached for the polyurethane prepolymer, then the chain terminator is added, and then base or acid is added to neutralize ionizable moieties incorporated from the ionizable reagent. The polyurethane solution is then converted to an aqueous polyurethane dispersion via the addition of water under high shear. If present, the volatile solvent can be distilled under reduced pressure.

In all polyurethane reaction schemes if the neutralization reactant has isocyanate reaction capability, (for example an alcohol, primary amine or secondary amine) it cannot be added prior to the chain terminating, urea forming amine. If the neutralization agent can function as a chain terminating reactant according to Structure (I), then it must be added after all of the other isocyanate reactive groups have been reacted.

Catalysts are not necessary to prepare the polyurethanes, but may provide advantages in their manufacture. The catalysts most widely used are tertiary amines and organo-tin compounds such as stannous octoate, dibutyltin dioctoate, dibutyltin dilaurate.

Preparation of the Polyurethane for Subsequent Conversion to a dispersion is facilitated by using solvent. Suitable solvents are those that are miscible with water and inert to isocyanates and other reactants utilized in forming the polyurethanes. If it is desired to prepare a solvent-free dispersion, then it is preferable to use a solvent with a high enough volatility to allow removal by distillation. However, polymerizable vinyl compounds may also be used as solvents, followed by free radical polymerization after inversion, thus forming a polyurethane acrylic hybrid dispersion. Typical solvents useful in the practice of the invention are acetone, methyl ethyl ketone, toluene, and N-methyl pyrollidone. Preferably the amount of solvent used in the reaction will be from about 10% to about 50%, more preferably from about 20% to about 40% of the weight. Alternatively, the polyurethane can be prepared in a melt with less than 5% solvent.

Process conditions for preparing the NCO containing prepolymers have been discussed in the publications previously noted. The finished NCO-containing prepolymer should have a isocyanate content of about 1 to about 20%, preferably about 1 to about 10% by weight, based on the weight of prepolymer solids.

Mixtures of compounds and/or polymers having mixed NCO reactive groups are also possible.

The process conditions used for preparing the urea-terminated ether type polyurethane of the present invention generally results in a polyurethane polymer of Structure I being present in the final product. However, it is understood that the final product will typically be a mixture of products, of which a portion is the desired polyurethane polymer, the other portion being a normal distribution of other polymer products and may contain varying ratios of unreacted monomers. The heterogeneity of the resultant polymer will depend on the reactants selected and reactant conditions chosen, as will be apparent to those skilled in the art.

Neutralization

In order to have a stable dispersion, a sufficient amount of the ionic groups must be neutralized so that, the resulting polyurethane will remain stably dispersed in the aqueous medium. Generally, at least about 70%, preferably at least about 80%, of the acid groups are neutralized to the corresponding carboxylate salt groups. Alternatively, cationic groups in the polyurethane can be quaternary ammonium groups (—$NR_3Y$, wherein Y is a monovalent anion such as chlorine or hydroxyl).

Suitable neutralizing agents for converting the acid groups to salt groups include tertiary amines, alkali metal cations and ammonia. Examples of these neutralizing agents are disclosed in previously incorporated U.S. Pat. No. 4,701,480, as well as U.S. Pat. No. 4,501,852 (the disclosure of which is incorporated by reference herein for all purposes as if fully set forth). Preferred neutralizing agents are the trialkyl-substituted tertiary amines, such as triethyl amine, tripropyl amine, dimethylcyclohexyl amine, dimethylethanol amine, and triethanol amine and dimethylethyl amine. Substituted amines are also useful neutralizing groups such as diethyl ethanol amine or diethanol methyl amine.

Neutralization may take place at any point in the process. Typical procedures include at least some neutralization of the prepolymer, which is then chain extended/terminated in water in the presence of additional neutralizing agent.

The polyurethane dispersion which is used as the dispersant is a stable aqueous dispersion of polyurethane particles having a solids content of up to about 60% by weight, preferably from about 10 to about 60% by weight, and more preferably from about 25 to about 45% by weight. However, it is always possible to dilute the dispersions to any minimum amount that can be used when the polyurethane is used as a dispersant. The solids content of the resulting dispersion may be determined by drying the sample in an oven at 150° C. for 2 hours and comparing the weights before and after drying. The particle size is generally below about 1.0 micron, and preferably between about 0.01 to about 0.5 micron. The average particle size should be less than about 0.5 micron, and preferably between about 0.01 to about 0.3 micron. The small particle size enhances the stability of the dispersed polyurethane particles In accordance with the present invention the term "aqueous polyurethane dispersion" refers to aqueous dispersions of polymers containing urethane groups, as that term is understood by those of ordinary skill in the art. These polymers also incorporate hydrophilic functionality to the extent required to maintain a stable dispersion of the polymer in water. The compositions of the invention are aqueous dispersions that comprise a continuous phase comprising water, and a dispersed phase comprising polyurethane.

Following formation of the desired polyurethane dispersion, preferably in the presence of solvent as discussed above, the pH may be adjusted typically pH about 7 to 9, if necessary, to insure conversion of ionizable groups to ionic groups. For example, if the preferred dimethylolpropionic acid is the ionic or ionizable ingredient used in making the polyurethane, then sufficient aqueous base is added to convert the carboxyl groups to carboxylate anions.

Conversion to the aqueous dispersion is completed by addition of water. If desired, solvent can then be removed partially or substantially by distillation which can be done under reduced pressure.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Polyurethane Pigment Dispersion Preparation

The urea-terminated polyurethanes are dispersants for particles, such as pigments. In this case, the polyurethane is either 1) utilized as a dissolved polyurethane in a compatible solvent where the initial polyurethane/particle mixture is prepared and then processed using dispersion equipment to produce the aqueous polyurethane dispersed particle; or 2) the polyurethane dispersion and the particle dispersed are mixed in a compatible solvent system which, in turn is processed using dispersion equipment to produce the aqueous polyurethane dispersed particle where the polyurethane is the dispersant. While not being bound by theory, it is assumed that the particle and the polyurethane have the appropriate physical/chemical interactions that are required to prepare a stable dispersion of particles especially pigments. Furthermore, it is possible that some of the polyurethane is not bound to the pigment and exists either as a dispersion of the polyurethane or polyurethane dissolved in the liquid phase of the dispersion.

The urea terminated polyurethane and ink compositions of the invention may be prepared by methods known in the art. It is generally desirable to make the urea terminated polyurethane in a concentrated form, which is subsequently diluted with a suitable liquid containing the desired additives. The urea terminated polyurethane dispersion is first prepared by premixing the selected pigment(s) and urea terminated polyurethane polymeric dispersant(s) in an aqueous carrier medium (such as water and, optionally, a water-miscible solvent), and then dispersing or deflocculating the pigment. The water miscible solvent is chosen to assure that during the particle dispersion process the polyurethane can function as a dispersant, that is, the polyurethane becomes the dispersant for the particle. Candidate water miscible solvents include Dipropylene Glycol Methyl Ether, Propylene Glycol Normal Propyl Ether, Ethylene Glycol Monobutyl Ether, Diethylene Gllycol Monobuty Ether, Isoproyl Alcohol, 2-Pyrrolidone, Triethylene Glycol Monobutyl Ether, tetraglyme, sulfolane, n-methylpyrrolidon, propylene carbonate. methyl ethyl ketone, methyl isobutyl ketone, butyrolactone The dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ, and nylon. These various dispersion processes are in a general sense well-known in the art, as exemplified by, U.S. Pat. No. 5,022,592, U.S. Pat. No. 5,026,427, U.S. Pat. No. 5,310,778, U.S. Pat. No. 5,891,231, U.S. Pat. No. 5,679,138, U.S. Pat. No. 5,976, 232 and US20030089277. All of these documents are incorporated by reference herein for all purposes as if fully set forth. Preferred are 2-roll mill, media mill, and by passing the mixture through a plurality of nozzles within a liquid jet interaction chamber at a liquid pressure of at least 5,000 psi.

After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment. The determination of sufficient let down conditions is needed for all combinations of the polymeric dispersant, the solvent and the pigment.

After the urea terminated polyurethane dispersion preparation, the amount of water-miscible solvent may be more than some ink jet applications will tolerate. For some of the urea terminated polyurethane dispersions, it thus may be necessary to ultrafilter the final dispersion to reduce the amount of water-miscible solvent. To improve stability and reduce the viscosity of the pigment dispersion, it may be heat treated by heating from about 30° C. to about 100° C., with the preferred temperature being about 70° C. for about 10 to about 24 hours. Longer heating does not affect the performance of the dispersion.

The amount of polymeric urea terminated polyurethane dispersants required to stabilize the pigment is dependent upon the specific urea terminated polyurethane dispersants, the pigment and vehicle interaction. The weight ratio of pigment to polymeric urea terminated polyurethane dispersants will typically range from about 0.5 to about 6. A preferred range is about 0.75 to about 4.

While not being bound by theory, it is believed that the urea terminated polyurethane's provide improved ink properties by the following means. Stable aqueous dispersions are critical for inkjet inks to assure long-lived ink cartridges and few problems with failed nozzles, etc. It is, however, desirable for the ink to become unstable as it is jetted onto the media so that the pigment in the ink "crashes out" onto the surface of the media (as opposed to being absorbed into the media). With the pigment on the surface of the media, beneficial properties of the ink can be obtained.

The urea terminated polyurethane polymeric dispersants provide novel dispersants that sufficiently stabilize the ink prior to jetting (such as in the cartridge) but, as the ink is jetted onto the paper, the pigment system is destabilized and the pigment remains on the surface of the media. This leads to improved ink properties.

EXAMPLES

The following examples are presented for the purpose of illustrating the invention and are not intended to be limiting. All parts, percentages, etc., are by weight unless otherwise indicated.

The dispersions whose preparation is described in the examples below were characterized in terms of their particle size and particle size distribution.

Ingredients and Abbreviations
BMEA=bis(methoxyethyl)amine
DBTL=dibutyltindilaurate
DMEA=dimethylethanolamine
DMIPA=dimethylisopropylamine
DMPA=dimethylol propionic acid
DMBA=dimethylol butyric acid
EDA=ethylene diamine
EDTA=ethylenediamine tetraacetic acid
HDI=1,6-hexamethylene diisocyanate
IPDI=isophoronediisocyanate
TMDI=trimethylhexamethylene diisocyanate
TMXDI=m-tetramethylene xylylene diisocyanate
NMP=n-Methyl pyrolidone
TEA=triethylamine
TEOA=triethanolamine
TETA=triethylenetetramine
THF=tetrahydrofuran
Tetraglyme=Tetraethylene glycol dimethyl ether Unless otherwise noted, the above chemicals were obtained from Aldrich (Milwaukee, Wis.) or other similar suppliers of laboratory chemicals.

TERATHANE® 650 is a 650 molecular weight, polytetramethylene ether glycol (PTMEG) from Invista, Wichita, Kans.

TERATHANE® 250 is a 250 molecular weight, polytetramethylene ether glycol (PTMEG)

Extent of Polyurethane Reaction

The extent of polyurethane reaction was determined by detecting NCO % by dibutylamine titration, a common method in urethane chemistry.

In this method, a sample of the NCO containing prepolymer is reacted with a known amount of dibutylamine solution and the residual amine is back titrated with HCl.

Particle Size Measurements

The particle size for the polyurethane dispersions, pigments and the inks were determined by dynamic light scattering using a Microtrac® UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution.

The reported numbers below are the volume average particle size.

Solid Content Measurement

Solid content for the solvent free polyurethane dispersions was measured with a moisture analyzer, model MA50 from Sartorius. For polyurethane dispersions containing high boiling solvent, such as NMP, tetraethylene glycol dimethyl ether, the solid content was then determined by the weight differences before and after baking in 150° C. oven for 180 minutes.

MW characterization

All molecular weights were determined by GPC (gel permeation chromatography) using poly(methyl methacrylate) standards with tetrahydrofuran as the elutent. Using statics derived by Flory, the molecular weight of the polyurethane may be calculated or predicted based on the NCO/OH ratio and the molecular weight of the monomers Urea Terminated Polyurethane Dispersant Example 1 IPDI/T650/DMPA AN45

A 2 L reactor was loaded with 136.7 g Terathane® 650, 84.3 g tetraethylene glycol dimethyl ether, and 32.1 g dimethylol proprionic acid. The mixture was heated to 110° C. with $N_2$ purge for 1 hr. Then the reaction was cooled to 80° C., and 0.3 g dibutyl tin dilaurate was added. Over 30 minutes 108.9 g isophorone diisocyanate was added followed by 28.2 g tetraethylene glycol dimethyl ether. The reaction was held at 80° C. for 5.5 hrs when the % NCO was below 1.6%. Then, 11.9 g bis(2-methoxy ethyl)amine was added over 5 minutes. After 2 hr at 80° C., the polyurethane solution was inverted under high speed mixing by adding a mixture of 45% KOH (22.8 g) and 320 g water followed by an additional 361.5 g water. The polyurethane dispersion had a viscosity of 20.6 cPs, 23.7% solids, particle size of d50=14 nm and d95=18 nm, and molecular weight by GPC of Mn 6320, Mw 17000, and Pd 2.7. The urea content is 4.1%.

Urea Terminated Polyurethane Dispersant Example 2 IPDI/ T650/DMPA AN30

A 2 L reactor was loaded with 154.3 g Terathane® 650, 95.2 g tetraethylene glycol dimethyl ether, and 20.4 g dimethylol proprionic acid. The mixture was heated to 110° C. with $N_2$ purge for 10 min. Then the reaction was cooled to 80° C., and 0.4 g dibutyl tin dilaurate was added. Over 30 minutes 96.0 g isophorone diisocyanate was added followed by 24.0 g tetraethylene glycol dimethyl ether. The reaction was held at 80° C. for 2 hrs when the % NCO was below 1.2%. Then, 10.6 g bis(2-methoxy ethyl)amine was added over 5 minutes. After 2 hr at 80° C., the polyurethane solution was inverted under high speed mixing by adding a mixture of 45% KOH (16.8 g) and 236 g water followed by an additional 467 g water. The polyurethane dispersion had a viscosity of 11.4 cPs, 25.3% solids, particle size of d50=22 nm and d95=35 nm, and molecular weight by GPC of Mn 6520, Mw 16000, and Pd 2.5. The urea content is 8.8%.

Urea Terminated Polyurethane Dispersant Example 3: IPDI/ 1000 PO3G/DMPA AN25

A 2 L was loaded reactor with 245.4 g PO3G (1075 MW) and heated to 110° C. under vacuum until contents had less than 600 ppm water. Then, added 170 g tetraethylene glycol dimethyl ether, and 22.4 g dimethylol proprionic acid. The reactor was cooled to 60° C., and 0.36 g dibutyl tin dilaurate was added. Over 1 hour, 96.7 g isophorone diisocyanate was feed in followed by 21.5 g tetraethylene glycol dimethyl ether. The reaction was held at 80° C. for 2 hrs when the % NCO was below 0.9%. The reaction was cooled to 50° C., and then, 35.3 g of 30 wt. % bis(methoxyethyl)amine in water was added over 5 minutes. After 0.5 hr at 60° C., the polyurethane solution was inverted under high speed mixing by adding a mixture of 45% KOH (18.8 g) and 262.5 g water followed by an additional 631.6 g water. The polyurethane dispersion had a viscosity of 13 cPs, 25.5% solids, and particle size of d50=35 nm and d95=47 nm. The urea content is 2.8%.

Urea Terminated Polyurethane Dispersant Example 4 IPDI/ 500 PO3G/DMPA AN20

A 2 L was loaded reactor with 214.0 g PO3G (545 MW), 149.5 g tetraethylene glycol dimethyl ether, and 18.0 g dimethylol proprionic acid. The mixture was heated to 110° C. under vacuum until contents had less than 500 ppm water. Then the reaction was cooled to 50 C, and 0.24 g dibutyl tin dilaurate was added. Over 30 minutes 128.9 g isophorone diisocyanate was added followed by 21.2 g tetraethylene glycol dimethyl ether. The reaction was held at 80 C for 3 hrs when the % NCO was below 1.1%. The reaction was cooled to 50° C., and then, 14.1 g bis(2-methoxy ethyl)amine was added over 5 minutes. After 1 hr at 60° C., the polyurethane solution was inverted under high speed mixing by adding a mixture of 45% KOH (15.1 g) and 211.2 g water followed by an additional 727.8 g water. The polyurethane dispersion had a viscosity of 7.86 cPs, 25.5% solids, and particle size of d50=47 nm and d95=72 nm. The urea content is 3.8%.

Urea Terminated Polyurethane Dispersant Example 5 TDI/ 500 PO3G/DMPA AN30

A 2 L was loaded reactor with 166.4 g PO3G (545 MW), 95.8 g tetraethylene glycol dimethyl ether, and 21.2 g dimethylol proprionic acid. The mixture was heated to 110° C. under vacuum until contents had less than 400 ppm water; approximately 3.5 hrs. Then the reaction was cooled to 70 C, and over 30 minutes, 89.7 g Toluene diisocyanate was added followed by 15.8 g tetraethylene glycol dimethyl ether. The reaction was held at 80° C. for 2 hrs when the % NCO was below 1.5%. Then, 12.4 g bis(2-methoxy ethyl)amine was added over 5 minutes. After 1 hr, removed 50 g for analysis. The remaining polyurethane solution was inverted under high speed mixing by adding a mixture of 45% KOH (15.5 g) and 218.0 g water followed by an additional 464 g water. The polyurethane dispersion had a viscosity of 17.6 cPs, 22.9% solids, particle size of d50=16 nm and d95=35 nm, and molecular weight by GPC of Mn 7465, Mw 15500, and Pd 2.08. The urea content is 4.3%.

Urea Terminated Polyurethane Dispersant Example 6 MDI/ 500 PO3G/DMPA AN30

The preparation was identical to Dispersant Example 5 except methylene diphenyl diisocyanate was used instead of toluene diisocyanate and the formulation was adjusted for molecular weight differences in order to maintain the same NCO/OH ratio. The polyurethane dispersion had a viscosity of 23.5% solids, 34 cPs, particle size of d50=18 nm and d95=23 nm, and molecular weight by GPC of Mn 11692, Mw 29141, and Pd 2.49. The urea content is 3.7%.

Urea Terminated Polyurethane Dispersant Example 7 IPDI/ 500 PO3G/DMPA AN30

The preparation was identical to Dispersant Example 5 except isophorone diisocyanate was used instead of toluene diisocyanate and the formulation was adjusted for molecular weight differences in order to maintain the same NCO/OH ratio. The polyurethane dispersion had a viscosity of 24.4% solids, 22.1 cPs, particle size of d50=nm and d95=nm, and molecular weight by GPC of Mn 8170, Mw 18084, and Pd 2.21. The urea content is 4.2%.

Urea Terminated Polyurethane Dispersant Example 8 IPDI/ 1500 PO3G/DMPA AN30

A 2 L reactor was loaded with 194.3 g PO3G (1516 MW), 95.8 g tetraethylene glycol dimethyl ether, and 21.0 g dimethylol proprionic acid. The mixture was heated to 110° C. under vacuum until contents had less than 400 ppm water; approximately 3.5 hrs. Then the reaction was cooled to 70 C, and over 30 minutes, 69.6 g m-isophorone diisocyanate was added followed by 11.6 g tetraethylene glycol dimethyl ether. The reaction was held at 80° C. for 4.5 hrs when the % NCO was below 1.1%. Then, 7.6 g bis(2-methoxy ethyl)amine was added over 5 minutes. After 1 hr, removed 50 g for analysis. The remaining polyurethane solution was inverted under high speed mixing by adding a mixture of 45% KOH (15.4 g) and 216 g water followed by an additional 478 g water. The polyurethane dispersion had a viscosity of 8.8 cPs, 23.2% solids, particle size of d50=12 nm and d95=23 nm, and molecular weight by GPC of Mn 8848, Mw 19048, and Pd 2.15. The urea content is 2.6%.

Urea Terminated Polyurethane Dispersant Example 9 TMXDI/T1000/DMPA AN30

A 2 L reactor was loaded with 221.6 g Terathane 1000 (977 MW), 127.5 g tetraethylene glycol dimethyl ether, and 27.0 g dimethylol proprionic acid. The mixture was heated to 110° C. under vacuum for 1 hour. Then the reaction was cooled to 90° C., and 0.32 g dibutyl tin dilaurate was added. Over 30 minutes 115 g m-Tetramethylene xylylene diisocyanate was added followed by 18.9 g tetraethylene glycol dimethyl ether. The reaction was held at 90° C. for 2 hrs when the % NCO was below 0.7%. Then, 11.4 g bis(2-methoxy ethyl)amine was added over 5 minutes. After 1 hr, the polyurethane solution was inverted under high speed mixing by adding a mixture of 45% KOH (22.6 g) and 316 g water followed by an additional 640 g water. The polyurethane dispersion was 25% solids with mean particle size of d50=34 nm and d95=48 nm. The urea content is 3.0%.

Urea Terminated Polyurethane Dispersant Example 10 IPDI/T650/DMPA AN60

The preparation was identical to Dispersant Example 1 with additional dimethylol proprionic acid replacing some of the Terathane 650 to adjust the final acid number of the polyurethane to 60 mg KOH/g polymer while maintaining the same NCO/OH ratio. This polyurethane dispersion had a viscosity of 21 cPs at 24.1% solids, particle size of d50=19 nm and d95=24 nm, and molecular weight by GPC of Mn 5944.

Urea Terminated Polyurethane Dispersant Example 11 IPDI/PO3G500/DMPA/BMEA/AN45

This example illustrates preparation of an organic solvent-containing aqueous polyurethane dispersion from polytrimethylene ether glycol, isophorone diisocyanate, dimethylolpropionic acid ionic reactant and bis(methoxyethyl)amine chain terminator.

A 2 L reactor was loaded with 214.0 g polytrimethylene ether glycol (Mn of 545), 149.5 g tetraethylene glycol dimethyl ether, and 18.0 g dimethylol proprionic acid. The mixture was heated to 110° C. under vacuum until contents had less than 500 ppm water. The reactor was cooled to 50° C., and 0.24 g dibutyl tin dilaurate was added. 128.9 g isophorone diisocyanate was added over thirty minutes, followed by 21.2 g tetraethylene glycol dimethyl ether. The reaction was held at 80° C. for 3 hrs, and the wt % NCO was determined to be below 1.1%. The reaction was cooled to 50° C., then 14.1 g bis(2-methoxyethyl) amine was added over 5 minutes. After 1 hr at 60° C., the polyurethane solution was inverted under high speed mixing by adding a mixture of 45% KOH (15.1 g) and 211.2 g water, followed by an additional 727.8 g water.

The resulting polyurethane had an acid number of 20 mg KOH/g solids, and the polyurethane dispersion had a viscosity of 7.86 cPs, 25.5 wt % solids, and a particle size of d50=47 nm and d95=72 nm. The urea content is 3.8%.

Urea Terminated Polyurethane Dispersant Example 12 IPDI/T250/DMPA AN40

This polyether diol was prepared in a manner similar to Example 1 with less dimethylol proprionic acid and Terathane 250 instead of Terathane 650 to adjust the final acid number of the polyurethane to 40 mg KOH/g polymer while maintaining the same NCO/OH ratio. The polyurethane solution was neutralized with TEA and inverted in water. This polyurethane dispersion had a viscosity of 25.1 cPs at 21.1% solids, particle size of d50=6.4 nm and d95=8.2 nm, and molecular weight by GPC of Mn 4301.

Urea Terminated Polyurethane Dispersant Example 13 IPDI/T650/DMPA AN30 DBA

A 2 L reactor was loaded with 154.7 Terathane 650, 95.3 g tetraethylene glycol dimethyl ether, and 20.3 g dimethylol proprionic acid. The mixture was heated to 110° C. with N2 purge for 10 min. Then the reaction was cooled to 80° C. Over 30 minutes 96.1 g isophorone diisocyanate was added followed by 24.0 g tetraethylene glycol dimethyl ether. The reaction was held at 85° C. for 3 hrs when the % NCO was below 1.2%. Then, 10.3 g dibutyl amine was added over 5 minutes. After 1 hr at 85° C., the polyurethane solution was inverted under high speed mixing by adding a mixture of 45% KOH (16.8 g) and 244 g water followed by an additional 458 g water. The polyurethane dispersion had a viscosity of 13.1 cPs, 25.3% solids, and particle size of d50=19 nm and d95=30 nm.

Urea Terminated Polyurethane Dispersant Example 14 (DEA Terminated 1,6 Hexane Diol, AN60)

To a dry, alkali- and acid-free flask, equipped with an addition funnel, a condenser, stirrer and a nitrogen gas line was added 55 g 1,6 Hexanediol, 48 g DMPA, 32.2 g TEA, 100 g acetone and 0.06 g DBTL. The contents were heated to 40° C. and mixed well. 227 g IPDI was then added to the flask via the addition funnel at 40° C. over 60 min, with any residual IPDI being rinsed from the addition funnel into the flask with 10 g acetone.

The flask temperature was raised to 50° C., held at 50° C. until NCO % was 3.5%% or less, then 39.5 gram DEA was added over 5 minutes followed by 5 gram acetone rinse. After 1 hour at 50° C., 613 g deionized (DI) water was added over 10 minutes via the addition funnel. The mixture was held at 50° C. for 1 hr, then cooled to room temperature.

Acetone (–115 g) was removed under vacuum, leaving a polyurethane solution with about 35.0% solids by weight. The final polyurethane dispersion had a viscosity of 30 cPs, pH 7.5, particle size of d50=86.5 nm.

Urea Terminated Polyurethane Dispersant Example 15 (T650/DMBA/DEA, AN40)

To a dry, alkali- and acid-free flask, equipped with an addition funnel, a condenser, stirrer and a nitrogen gas line was added 125 g Terathane650, a 650 MW polyether diol from Invista, 25 g DMBA, and 0.04 g DBTL. The contents were heated to 90° C. and mixed well. 110 g TMXDI was then added to the flask via the addition funnel at 90° C. over 60 min. The flask temperature was raised to 95° C., held at 95° C. until NCO % was 2.9% or less, then 17.8 gram DEA was added over 5 minutes. After 1 hour at 95° C., the flask temperature was lowered to 75° C. 15.4 gram TEA was then added followed by 465 g deionized (DI) water over 10 minutes via the addition funnel. The mixture was held at 75° C. for 1 hr, then cooled to room temperature.

The final polyurethane dispersion had a viscosity of 40 cPs, 37.6% solids, pH 7.9, particle size of d50=14.5 nm.

Urea Terminated Polyurethane Dispersant Example 16 (T650/TMXDI/DMBA/Aminoacid/DEA, AN 325)

To a dry, alkali- and acid-free flask, equipped with an addition funnel, a condenser, stirrer and a nitrogen gas line was added 155 g Terathane650, 18 g DMBA, and 0.04 g DBTL. The contents were heated to 90° C. and mixed well. 110 g TMXDI was then added to the flask via the addition funnel at 90° C. over 60 min. The flask temperature was raised to 95° C., held at 95° C. for 1 hour, then 8 gram DEA was added over 5 minutes and held at 95° C. until NCO % was 1.5% or lower. The flask temperature was lowered to 75° C. 11.55 TEA was added and mixed well. 325 g deionized (DI) water was added over 10 minutes via the addition funnel followed by mixture of 6-aminocaproic acid (13.6 g), TEA (9.4 g) and water (130 g) solution. The dispersion was held at 75° C. for 1 hr, then cooled to room temperature.

The final polyurethane dispersion had a viscosity of 40 cPs, 28% solids, pH 10, particle size of d50=18.5 nm.

Urea Terminated Polyurethane Dispersant Example 17 (IPDI/T650/DEA/KOH AN60)

To a dry, alkali- and acid-free flask, equipped with an addition funnel, a condenser, stirrer and a nitrogen gas line was added 115 g Terathane 650, a 650 MW polyether diol from Invista, 39 g DMPA and 115 g Tetraglyme. The contents were heated to 60° C. and mixed well. 115 g IPDI was then added to the flask via the addition funnel at 60° C. over 60 min, with any residual IPDI being rinsed from the addition funnel into the flask with 10 g Tetraglyme.

The flask temperature was raised to 80° C., held for 120 minutes until NCO % was 1.17% or less, then 10.5 gram DEA was added over 5 minutes.

With the temperature at 80° C., mixture of 34.4 gram 45% KOH solution and 754.5 g deionized (DI) water was added over 10 minutes via the addition funnel. The mixture was held at 50° C. for 1 hr, then cooled to room temperature. The final polyurethane dispersion had a viscosity of 18.5 cPs, 24% solids, pH 7.42, particle size of d50=4.4 nm.

Urea Terminated Polyurethane Dispersant Example 18 (IPDI/T650/DEA/TEA AN60)

To a dry, alkali- and acid-free flask, equipped with an addition funnel, a condenser, stirrer and a nitrogen gas line was added 140 g Terathane 650, a 650 MW polyether diol from Invista, 47 g DMPA, 33.3 g TEA, 100 g acetone and 0.06 g DBTL. The contents were heated to 40° C. and mixed well. 140 g IPDI was then added to the flask via the addition funnel at 40° C. over 60 min, with any residual IPDI being rinsed from the addition funnel into the flask with 10 g acetone.

The flask temperature was raised to 50° C., held at 50° C. until NCO % was 1.15% or less, then 12.9 gram DEA was added over 5 minutes followed by 5 gram acetone rinse. After 1 hour at 50° C., 633 g deionized (DI) water was added over 10 minutes via the addition funnel. The mixture was held at 50° C. for 1 hr, then cooled to room temperature.

Acetone (~115 g) was removed under vacuum, leaving a polyurethane solution with about 35.0% solids by weight. The final polyurethane dispersion had a viscosity of 500 cPs, pH 7.6, particle size of d50=9.3 nm.

Urea Terminated Polyurethane Dispersant Example 19 (IPDI/T650/DEA/TEA AN60, Higher MW)

To a dry, alkali- and acid-free flask, equipped with an addition funnel, a condenser, stirrer and a nitrogen gas line was added 140 g Terathane 650, a 650 MW polyether diol from Invista, 44 g DMPA, 31.2 g TEA, 94 g acetone and 0.06 g DBTL. The contents were heated to 40° C. and mixed well. 127 g IPDI was then added to the flask via the addition funnel at 40° C. over 60 min, with any residual IPDI being rinsed from the addition funnel into the flask with 10 g acetone.

The flask temperature was raised to 50° C., held at 50° C. until NCO % was 0.53% or less, then 5.6 gram DEA was added over 5 minutes followed by 5 gram acetone rinse. After 1 hour at 50° C., 578 g deionized (DI) water was added over 10 minutes via the addition funnel. The mixture was held at 50° C. for 1 hr, then cooled to room temperature.

Acetone (~109 g) was removed under vacuum, leaving a polyurethane solution with about 35.0% solids by weight. The final polyurethane dispersion had a viscosity of 500 cPs, pH 7.7, particle size of d50=16 nm.

Urea Terminated Polyurethane Dispersant Example 20 IPDI/HD BMEA AN30

A 2 L reactor was loaded with 70.9 1,6-hexane diol, 55.3 g tetraethylene glycol dimethyl ether, and 21.5 g dimethylol proprionic acid. The mixture was heated to 110° C. with $N_2$ purge for 30 min. Then the reaction was cooled to 80° C., and 0.5 g dibutyl tin dilaurate was added. Over 30 minutes 185.8 g isophorone diisocyanate was added followed by 45.8 g tetraethylene glycol dimethyl ether. The reaction was held at 85° C. for 2 hrs when the % NCO was below 2.1%. Then, 20.3 g bis(2-methoxy ethyl)amine was added over 5 minutes. After 1 hr at 85° C., the polyurethane solution was inverted under high speed mixing by adding a mixture of 45% KOH (15.7 g) and 222 g water followed by an additional 489 g water. The polyurethane dispersion had a viscosity of 9.9 cPs, 25.3% solids, pH 8.0, particle size of d50=17 nm and d95=26 nm, and molecular weight by GPC of Mn 5611, Mw 10316, and PD 1.8.

Urea Terminated Polyurethane Dispersant Example 21 IPDI/DDD BMEA AN30

A 2 L reactor was loaded with 95.9 1,12-dodecane diol, 74.9 g tetraethylene glycol dimethyl ether, and 20.6 g dimethylol proprionic acid. The mixture was heated to 110° C. with $N_2$ purge for 1 hr. Then the reaction was cooled to 80° C., and 0.4 g dibutyl tin dilaurate was added. Over 30 minutes 153.5 g isophorone diisocyanate was added followed by 37.9 g tetraethylene glycol dimethyl ether. The reaction was held at 85° C. for 2 hrs when the % NCO was below 1.8%. Then, 16.9 g bis(2-methoxy ethyl)amine was added over 5 minutes. After 1 hr at 85° C., the polyurethane solution was inverted under high speed mixing by adding a mixture of 45% KOH (16.9 g) and 214 g water followed by an additional 458 g water. The polyurethane dispersion had a viscosity of 11.2 cPs, 25.4% solids, pH 7.9, particle size of d50=17 nm and d95=25 nm, and molecular weight by GPC of Mn 6640, Mw 12615, and PD 1.9.

Urea Terminated Polyurethane Dispersant Example 22 IPDI/T650/DMPA AN90

The preparation was identical to Dispersant Example 1 with additional dimethylol proprionic acid replacing some of the Terathane 650 to adjust the final acid number of the polyurethane to 90 mg KOH/g polymer while maintaining the same NCO/OH ratio. This polyurethane dispersion had a viscosity of 45.6 cPs at 26.2% solids, particle size of d50=19 nm and d95=22 nm, and molecular weight by GPC of Mn 6916.

Urea Terminated Polyurethane Dispersant Example 23 TMDI/T650/DMPA AN45

A 2 L reactor was loaded with 136.5 Terathane 650, 95.5 g tetraethylene glycol dimethyl ether, and 30.2 g dimethylol proprionic acid. The mixture was heated to 115° C. with $N_2$ purge for 60 min. Then the reaction was cooled to 80° C. Over 30 minutes 101.3 g trimethylhexamethylene diisocyanate (Vestanat TMDI) was added followed by 26.0 g tetraethylene glycol dimethyl ether. The reaction was held at 85° C. for 1.5 hrs when the % NCO was below 1.0%. Then, 11.8 g bis(2-methoxy ethyl)amine was added over 5 minutes. After 1 hr at 85° C., the polyurethane solution was inverted under high speed mixing by adding a mixture of 45% KOH (25 g) and 349 g water followed by an additional 349 g water. The polyurethane dispersion had a viscosity of 20.3 cPs, 25.2% solids, and particle size of d50=16 nm and d95=20 nm.

Urea Terminated Polyurethane Dispersant Example 24 TMDI/T650/DMPA AN30

A 2 L reactor was loaded with 155.0 Terathane 650, 101.9 g tetraethylene glycol dimethyl ether, and 19.9 g dimethylol proprionic acid. The mixture was heated to 115° C. with $N_2$ purge for 30 min. Then the reaction was cooled to 80° C. Over 30 minutes 90.3 g trimethylhexamethylene diisocyanate (Vestanat TMDI) was added followed by 22.3 g tetraethylene glycol dimethyl ether. The reaction was held at 85° C. for 5.5 hrs when the % NCO was below 1.0%. Then, 10.5 g bis(2-methoxy ethyl)amine was added over 5 minutes. After 1 hr at 85° C., the polyurethane solution was inverted under high speed mixing by adding a mixture of 45% KOH (16.3 g) and 229 g water followed by an additional 448 g water. The polyurethane dispersion had a viscosity of 38.7 cPs, 25.0% solids, and particle size of d50=11 nm and d95=19 nm.

Urea Terminated Polyurethane Dispersant Example 25 TDI/500 PO3G/DMPA AN30

A 2 L reactor was loaded with 166.4 PO3G (545 MW, 95.8 g tetraethylene glycol dimethyl ether, and 21.2 g dimethylol proprionic acid. The mixture was heated to 110° C. under vacuum until contents had less than 400 ppm water; approximately 3.5 hrs. Then the reaction was cooled to 70 C, and over 30 minutes, 89.7 g Toluene diisocyanate was added followed by 15.8 g tetraethylene glycol dimethyl ether. The reaction was held at 80° C. for 2 hrs when the % NCO was below 1.5%. Then, 12.4 g bis(2-methoxy ethyl)amine was added over 5 minutes. After 1 hr at 60° C., removed 50 g for analysis. The remaining polyurethane solution was inverted under high speed mixing by adding a mixture of 45% KOH (15.5 g) and 218.0 g water followed by an additional 464 g water. The polyurethane dispersion had a viscosity of 17.6 cPs, 22.9% solids, particle size of d50=16 nm and d95=35 nm, and molecular weight by GPC of Mn 7465, Mw 15500, and Pd 2.08.

Urea Terminated Polyurethane Dispersant Example 26 12IPDI/15DHE T650 BMEA 45AN 90% KOH A 2 L reactor was loaded with 109.7 g Terathane® 650, 33.8 g tetraethylene glycol dimethyl ether, 6.6 g Dantocol DHE (1,3-dihydroxyethyl dimethyl hydantoin) and 27.0 g dimethylol proprionic acid. The mixture was heated to 75° C. with $N_2$ purge for 20 minutes. Then, 0.4 g dibutyl tin dilaurate was added. Over 60 minutes 96.6 g isophorone diisocyanate was added followed by 8.0 g tetraethylene glycol dimethyl ether. The reaction was held at 80° C. for 4 hrs when the corrected % NCO was below 1.5%. Then, 9.7 g bis(2-methoxy ethyl)amine was added over 5 minutes. After 1 hr at 80° C., the polyurethane solution was inverted under high speed mixing by adding a mixture of 45% KOH (22.6 g) and 317 g water followed by an additional 372 g water. The polyurethane dispersion had a viscosity of 35 cPs, 25.4% solids, and a particle size of d50=22.5 nm and d95=26.6 nm. The urea content is 3.9%.

Comparative Polyurethane Dispersant 1 Diamine as Chain Extender

To a dry, alkali- and acid-free flask, equipped with an addition funnel, a condenser, stirrer and a nitrogen gas line was added 699.2 g Desmophen C 1200, a polyester carbonate diol, (Bayer), 280.0 g acetone and 0.06 g DBTL. The contents were heated to 40° C. and mixed well. 189.14 g IPDI was then added to the flask via the addition funnel at 40° C. over 60 min, with any residual IPDI being rinsed from the addition funnel into the flask with 15.5 g acetone.

The flask temperature was raised to 50° C., held for 30 minutes then followed by 44.57 g DMPA, then followed by 25.2 g TEA, was added to the flask via the addition funnel, which was then rinsed with 15.5 g acetone. The flask temperature was then raised again to 50° C. and held at 50° C. until NCO % was 1.14% or less.

With the temperature at 50° C., 1520.0 g deionized (DI) water was added over 10 minutes, followed by 131.00 g EDA (as a 6.25% solution in water) over 5 minutes, via the addition funnel, which was then rinsed with 80.0 g water. The mixture was held at 50° C. for 1 hr, then cooled to room temperature.

Acetone (~310.0 g) was removed under vacuum, leaving a final dispersion of polyurethane with about 35.0% solids by weight.

Comparative Polyurethane Dispersant 2 IPDI/PPG400 BMEA AN30

A 2 L reactor was loaded with 141.5 g Polypropylene glycol 400 MW (Poly-G 20-265, OH #268, from Arch Chemical), 81.5 g tetraethylene glycol dimethyl ether, and 21.5 g dimethylol proprionic acid. The mixture was heated to 110° C. with $N_2$ purge for 1 hr. Then the reaction was cooled to 70° C., and 0.3 g dibutyl tin dilaurate was added. Over 30 minutes 121.9 g isophorone diisocyanate was added followed by 20.1 g tetraethylene glycol dimethyl ether. The reaction was held at 80° C. for 5 hrs when the % NCO was below 1.3%. Then, 13.3 g bis(2-methoxy ethyl)amine was added over 5 minutes. After 2 hr at 80° C., the polyurethane solution was inverted under high speed mixing by adding a mixture of 45% KOH (15.8 g) and 239 g water followed by an additional 476 g water. The polyurethane dispersion had a viscosity of 25.5 cPs, 23.6% solids, pH 8.3, particle size of d50=8 nm and d95=13 nm, and molecular weight by GPC of Mn 5881, Mw 12483, and PD 2.1.

Comparative Polyurethane Dispersant 3 IPDI/PPG1000 BMEA AN30

A 2 L reactor was loaded with 175.6 g Polypropylene glycol 400 MW (Poly-G 20-112, OH #112.7, from Arch Chemical), 101.2 g tetraethylene glycol dimethyl ether, and 20.6 g dimethylol proprionic acid. The mixture was heated to 110° C. with N2 purge for 1 hr. Then the reaction was cooled to 70° C., and 0.3 g dibutyl tin dilaurate was added. Over 30 minutes 80.7 g isophorone diisocyanate was added followed by 13.4 g tetraethylene glycol dimethyl ether. The reaction was held at 80° C. for 3.5 hrs when the % NCO was below 1.3%. Then, 8.9 g bis(2-methoxy ethyl)amine was added over 5 minutes. After 2 hr at 80° C., the polyurethane solution was inverted under high speed mixing by adding a mixture of 45% KOH (15.1 g) and 220 g water followed by an additional 448 g water. The polyurethane dispersion had a viscosity of 9.7 cPs, 24.2% solids, pH 7.5, and particle size of d50=118 nm and d95=141 nm.

Preparation of Pigmented Dispersions

The pigmented dispersions used in this invention can be prepared using any conventional milling process known in the art. Most milling processes use a two-step process involving a first mixing step followed by a second grinding step. The first step comprises a mixing of all the ingredients, that is, pigment, dispersants, liquid carriers, pH adjuster and any optional additives to provide a blended "premix". Typically all liquid ingredients are added first, followed by the dispersants and lastly the pigment. Mixing is generally done in a stirred mixing vessel and high-speed dispersers, (HSD), are particularly suitable for the mixing step. A Cowels type blade attached to the HSD and operated at 500 rpm to 4000 rpm, and preferably 2000 rpm to 3500 rpm, provides optimal shear to achieve desired mixing. Adequate mixing is achieved usually in mixing from 15 minutes to 60 minutes.

The second step comprises grinding of the premix to produce a pigmented dispersion. Preferably, grinding occurs by a media milling process although other milling techniques can be used. In this invention a lab-scale Eiger Minimill, model M250, VSE EXP from Eiger Machinery Inc. Chicago, Ill. was used. Grinding was accomplished by charging about 820 grams of 0.5 YTZ zirconia media to the mill. The mill disk speed was operated between 2000 rpm and 4000 rpm and preferably at 3000 rpm and 3500 rpm. The dispersion is processed using a re-circulation grinding process and flow rates though the mill were typically 200 to 500 grams/min. and preferably 300 grams per min. The milling may be done using a staged procedure in which a fraction of the solvent is held out of the grind and added after milling is completed. This amount of solvent held out during milling varies by dispersion and is typically 200 to 400 grams of the total 800-gram batch size. This is done to achieve optimal rheology for grinding efficiency. The invention example dispersions each were normally processed for a total of 4 hours milling time.

After completion of milling process, the dispersion was filled into a polyethylene container. Optionally, the dispersion may be further processed using conventional filtration procedures known in the art. The dispersions may be processed using ultrafiltration techniques that remove co-solvents and other contaminants, ions or impurities from the dispersion. The dispersions were tested for pH, conductivity, viscosity and particle size. To assess dispersion stability, the above properties were remeasured after oven aging of samples for 1 week at 70° C. and noting if significant change versus initial readings had occurred.

Pigmented dispersions were prepared with magenta, yellow, cyan and black pigments. For the examples in Table 1, the following pigments were used Clarient Hostaperm Pink E-02, PR-122 (Magenta), and Degussa's Nipex 180 IQ powder (Black, K).

The following procedure was used to prepare the pigment dispersions with invention dispersing resin. Using an Eiger Minimill, the premix was prepared at typically 20-30% pigment loading and the targeted dispersant level was selected at a P/D (pigment/dispersant) ratio of 1.5-3.0. Optionally, a co-solvent was added at 10% of the total dispersion formulation to facilitate pigment wetting and at least partial dissolution of the polyurethanes in premix stage and ease of grinding during milling stage. Although other similar co-solvents are suitable, triethylene glycol monobutyl ether (TEB as supplied from Dow Chemical) was the co-solvent of choice. The invention resins were pre-neutralized with either KOH or amine to facilitate solubility and dissolution into water. During the premix stage the pigment level was maintained at typically 27% and was subsequently reduced to about 24% during the milling stage by adding deionized water for optimal media mill grinding conditions. After completion of the milling stage, which was typically 4 hours, the remaining letdown of de-ionized water was added and thoroughly mixed.

All the pigmented dispersions processed with co-solvent were purified using an ultrafiltration process to remove co-solvent(s) and filter out other impurities and ions that may be present. After completion, the pigment levels in the dispersions were reduced to about 10 to 15%. A total of 6 different magenta and 3 black dispersions were prepared with the invention dispersing resins.

Example Pigment Dispersions

Tabulated below are pigment dispersions stabilized with polyurethane dispersants, synthesized by the method previously outlined above. The polyurethane dispersants listed refer to the Polyurethane Dispersants listed above.

The initial dispersion properties are tabulated and their one-week oven stability results are reported in Table 1 and 2, respectively. The initial particle size, viscosity, and conductivity for these dispersions were 68-144 nm, 3.1-9.8 cPs, and 0.71-2.1 mS/cm, respectively, with the pH ranging from 8.1 to 9.9. The particle size for these dispersions was stable with oven aging with a typical, mean particle size change of 20% with oven aging, but the viscosity and pH did change significantly.

TABLE 1

Pigments Dispersion Examples

| Pigment Dispersion | Pig. % | Pigment/ Dispersant | Polyurethane Dispersant Example | Particle Size d50, nm | Viscosity (cPs) | pH |
|---|---|---|---|---|---|---|
| M1 | 12.6 | 2.5 | 2 | 102 | 5.9 | 8.5 |
| M2 | 12.5 | 2.5 | 3 | 95 | 5.9 | 8.8 |
| M3 | 11.7 | 2.5 | 4 | 98 | 4.5 | 8.6 |
| M4 | 14.7 | 2.5 | 5 | 135 | 16.4 | 9.4 |
| M5 | 14.7 | 2.5 | 6 | 150 | 5.6 | 8.3 |
| M6 | 14.9 | 2.5 | 7 | 170 | 5.6 | 8.4 |
| K1 | 14.7 | 2.5 | 1 | 98 | 3.6 | 6.8 |
| K2 | 15.1 | 2.5 | 5 | 105 | 4.8 | 7.1 |
| K3 | 15 | 2.5 | 7 | 157 | 5.7 | 6.9 |
| Comp. Dispersant M | | | Comp. PU | NA | Gelled | NA |

In addition, a dispersion Comparative Dispersion Magenta-1 was made from the Comparative Dispersant, a diamine chain extended polyurethane dispersion. This dispersant failed as a dispersant for the magenta pigment; it gelled at the premix stage of the dispersion process.

TABLE 2

Pigment Dispersion Properties after Oven Aging (70° C. 1 week)

| Pigment Dispersion | Particle Size nm, $d_{50}$ | Viscosity (cPs) | pH |
|---|---|---|---|
| M1 | 95 | 4.0 | 8.4 |
| M2 | 120 | 5.3 | 8.9 |
| M3 | 97 | 3.1 | 9.0 |
| M4 | 158 | 15.2 | 9.3 |
| M5 | 163 | 7.2 | 8.5 |
| M6 | 165 | 6.4 | 8.8 |
| K1 | 130 | 12 | 7.0 |
| K2 | 117 | 6.7 | 7.0 |
| K3 | 171 | 13.5 | 6.8 |

Preparation of Inks

The inks were prepared with pigmented dispersions made using urea terminated polyurethane dispersant polymers described above, by conventional process known to the art. The pigmented dispersions were processed by routine operations suitable for inkjet ink formulation.

Typically, in preparing ink, all ingredients except the pigmented dispersion were first mixed together. After all the other ingredients were mixed, the pigmented dispersion is added. Common ingredients in ink formulations useful in pigmented dispersions include one or more humectants, co-solvent(s), one or more surfactants, a biocide, a pH adjuster, and de-ionized water.

The selected Magenta pigmented dispersions from example dispersions in Table 1 were prepared into Magenta ink formulations in which the targeted percent pigment in ink jet ink was 4.0%. Water, Polyurethane binder, Dowanol TPM, 1,2-hexanediol, ethylene glycol, Surfynol 445, and Proxel GXL were mixed with the prepared pigment dispersions in the percentages detailed in Table 3. Polyurethane binder is a crosslinked polyurethane dispersion prepared as PUD EXP1 in US 20050215663 A1, Dowanol TPM is Tripropylene glycol methyl ether from Dow Chemical, Proxel GXL is a biocide available from Avecia, Inc. and Surfynol 440 is a surfactant available from Air Products. The inks were mixed for 4 hours and then filtered through a 1 micron filtration apparatus, removing any large agglomerates, aggregates or particulates.

TABLE 3

Magenta Ink Composition

| Ink Ingredient | Weight % in Ink |
|---|---|
| 1,2 hexanediol | 7.00% |
| Dowanol TPM | 2.60% |
| Ethylene glycol | 6.3% |
| Surfynol 440 | 0.25% |
| Proxel GXL | 0.15% |
| Polyurethane binder | 4.00% |
| Pigment | 4.00% |
| Water (Balance to 100%) | Balance |

Ink Properties

The ink properties measured were pH, viscosity, conductivity, particle size and surface tension. The particle size was measured using a Leeds and Northrup, Microtrac Ultrafine Particle Analyser (UPA). The viscosity was measured with a Brookfield Viscometer (Spindle 00, 25° C., 60 rpm). The properties of the inks prepared using example dispersions containing invention dispersing resins are reported in Table 4.

Jet velocity, drop size and stability are greatly affected by the surface tension and the viscosity of the ink. Inkjet inks typically have a surface tension in the range of about 20 dyne/cm to about 60 dyne/cm at 25° C. Viscosity can be as high as 30 cPs at 25° C., but is typically significantly lower. The inks have physical properties compatible with a wide range of ejecting conditions, i.e., driving frequency of the piezo element, or ejection conditions for a thermal head, for either a drop-on-demand device or a continuous device, and the shape and size of the nozzle. The inks of this invention should have excellent storage stability for long periods so as not clog to a significant extent in an ink jet apparatus. Further, it should not alter the materials of construction of the ink jet printing device it comes in contact with, and be essentially odorless and non-toxic.

Although not restricted to any particular viscosity range or printhead, the inventive inks are suited to lower viscosity applications such as those required by higher resolution (higher dpi) printheads that jet small droplet volumes, e.g. less than about 20 pL. Thus the viscosity (at 25° C.) of the inventive inks can be less than about 10 cPs, is preferably less than about 7 cPs, and most advantageously is less than about 5 cPs.

TABLE 4

Ink Properties of Pigmented Inks using Polyurethane Dispersants

| Ink | pH | Conductivity (us/cm) | Viscosity (cPs) | Particle Size $d_{50}$ | Surface Tension dynes/cm |
|---|---|---|---|---|---|
| Ink-1 from Disp M1 | 8.2 | 0.41 | 5.7 | 190 | 29.4 |
| Ink-2 from Disp M2 | 8 | 0.41 | 9.3 | 185 | 29.6 |
| Ink-3 from Disp M3 | 8 | 0.54 | 3.5 | 112 | 29.6 |
| Ink-4 from Disp M5 | 8.2 | 0.87 | 3.5 | 243 | 30 |

Print Properties: Paper Substrate

The printing of the test examples was done in the following manner unless otherwise indicated. The printing for the inks with dispersions prepared with the urea terminated polyurethanes was done on an Epson 980 printer (Epson America Inc, Long Beach, Calif.) using the black printhead which has a nominal resolution of 360 dots per inch. The printing was done in the software-selected standard print mode. The optical density and chroma were measured using a Greytag-Macbeth SpectoEye instrument (Greytag-Macbeth AG, Regensdorf, Switzerland). The DOI was measured by a Byk Gardner Wave-Scan DOI and the Gloss was measured by Byk Gardner Micro-TRI-Gloss. (Byk-Gardner, Columbia, Md.

Unless otherwise specified the ink formulation was as follows with all components as weight percent

TABLE 5

Ink Formulation

| Pigment | 3 |
|---|---|
| Dispersant | 1.2 |
| 1,2-hexanediol | 4 |
| Glycerol | 10 |
| Ethylene glycol | 5 |
| 2-Pyrrolidone | 3 |
| Proxel GXL | 0.25 |
| Water (Balance to 100%) | Bal. |

Comparison of Colored Inks to Dye inks.

Colored inks were prepared using the formulation listed in Table 5; the inventive urea terminated polyurethane dispersant used was urea terminated polyurethane Disp Ex 2.

TABLE 6

Inventive Inks and Commercial dye inks

| Ink | Color | Pigment | OD | DOI |
|---|---|---|---|---|
| Ink-5 | M, Magenta | R122 | 1 | 2.3 |
| Ink-6 | Y, Yellow | Y74 | 0.93 | 2.4 |
| Ink-7 | C, Cyan | PB 15:3 | 0.93 | 2.6 |
| Comp Ink 1, Dye | | | 1.15 | 2.5 |
| Comp Ink 2, Dye | | | 0.97 | 2.4 |
| Comp Ink 3, Dye | | | 1.15 | 3 |

The inventive inks as pigmented inks rival the OD and DOI the less durable dye inks.

Optical Properties of Prints from the Inventive Inks

Inks were prepared using the formulation shown in Table 5 and the dispersants noted in Table 7. The optical properties were measured. The NCO/OH mole ratio noted is the ratio of NCO/OH of the added isocyanate and isocyanate reactive components for preparation of the prepolymer, just prior to the addition of the chain terminated amine.

TABLE 7

Inventive Inks: print properties

| Ink | Dispersant Example/Paper and Parameter Measured | Hammermill Copy Plus pg 1 OD @100% | Xerox OD @100% | Epson Premium Photo Glossy Paper: Gloss 60 degree at 100% | Epson Premium Photo Glossy Paper OD | Epson Premium Photo Glossy Paper DOI | NCO/OH for prepolymer mole ratio |
|---|---|---|---|---|---|---|---|
| Ink Ex 8 | Disp. Ex. 21 | 0.83 | 0.86 | 55.6 | 1.78 | 103 | 11:10 |
| Ink Ex 9 | Disp. Ex. 2 except 8/7 NCO/OH mole ratio | 0.87 | 0.93 | 106.5 | 1.88 | 2.2 | 8:7 |
| Ink Ex 10 | Disp Ex 1 except PO3G 2400 | 0.88 | 0.95 | 96.6 | 1.82 | 2.1 | 11:10 |
| Ink Ex 11 | Disp. Ex. 22 | 0.84 | 0.86 | 82.2 | 1.92 | 1.7 | 11:10 |
| Ink Ex 12 | Disp. Ex. 24 | 0.86 | 0.92 | 100.2 | 1.78 | 2.2 | 11:10 |
| Ink Ex 13 | Disp. Ex. 23 | 0.85 | 0.88 | 109.4 | 1.94 | 2.3 | 11:10 |

TABLE 7-continued

Inventive Inks: print properties

| Ink | Dispersant Example/Paper and Parameter Measured | Hammermill Copy Plus pg 1 OD @100% | Xerox OD @100% | Epson Premium Photo Glossy Paper: Gloss 60 degree at 100% | Epson Premium Photo Glossy Paper OD | Epson Premium Photo Glossy Paper DOI | NCO/OH for prepolymer mole ratio |
|---|---|---|---|---|---|---|---|
| Ink Ex 14 | Disp. Ex. 2 except 14/13 NCO/OH mole ratio | 0.87 | 0.91 | 104.2 | 1.9 | 2.2 | 14:13 |
| Ink Ex 15 | Disp. Ex. 2 | 0.85 | 0.86 | 104.6 | 1.81 | 2.5 | 11:10 |
| Comp Ink Ex 4 | EHMA/MAA 90/10 dispersant (1) | 0.87 | 0.95 | 57.9 | 1.88 | 1.1 | |
| Comp Ink Ex 5 | Epson magenta Dye Ink | 1 | 1.06 | 49.6 | 1.88 | 2.5 | 11:10 |

(1) This dispersant is a random polymer of 2-ethylhexyl methacrylate and methacrylic acid in a 90/10 weight ratio.

It synthesis is similar to Example 1c of previously incorporated US2005/0090599 except 2-ethylhexyl methacrylate was substituted for benzylmethacrylate. The inventive inks with the urea terminated polyurethane dispersants produce better Gloss and DOI than similar pigmented inks with acrylic dispersants.

Printing Properties: Textiles

The Inkjet inks with invention dispersing resins were printed using a commercially available Epson 3000 piezo printhead type printer although any suitable inkjet printer could be used. The substrate used was 419 100% cotton from Testfabrics. The printed textiles may optionally be post processed with heat and/or pressure, such as disclosed in US20030160851 (the disclosure of which is incorporated by reference herein for all purposes as if fully set forth. In this case, all test prints were fused at about 170° C. for about 2 minutes.

Colorimetric measurements were done using a Minolta Spectrophotometer CM-3600d using Spectra Match software.

Where indicated the printed textile was tested for washfastness according to methods developed by the American Association of Textile Chemists and Colorists, (AATCC), Research Triangle Park, N.C. The AATCC Test Method 61-1996, "Colorfastness to Laundering, Home and Commercial: Accelerated", was used. In that test, colorfastness is described as "the resistance of a material to change in any of its color characteristics, to transfer of its colorant(s) to adjacent materials or both as a result of the exposure of the material to any environment that might be encountered during the processing, testing, storage or use of the material." Tests 3A was done and the color washfastness and stain rating were recorded. The ratings for these tests are from 1-5 with 5 being the best result, that is, little or no loss of color and little or no transfer of color to another material, respectively. Crock measurements were made using methodology described in AATCC Test Method 8-1996.

The printing results using an Epson 3000 piezo type printer, for selective inks make with pigments stabilized by invention dispersing resins are reported in Table 5.

TABLE 8

Print Properties of Pigmented Inks with Polyurethane Dispersants

| Ink | OD | 3A washfastness | Dry Crock | Wet Crock |
|---|---|---|---|---|
| Ink-M1 | 1.02 | 4.5 | 3.5 | 3.0 |
| Ink-M2 | 1.02 | 4.0 | 3.5 | 3.0 |
| Ink-M3 | 1.04 | 4.5 | 3.0 | 3.0 |
| Ink-M5 | 1.03 | 4.5 | 3.0 | 2.5 |

The inventive urea terminated polyurethane dispersants provide excellent performance for textile printing.

The salt stability test was introduced as a means to measure polymeric dispersions and their propensity to 'crash' out onto a substrate, especially paper. This was described in previously incorporated US2005/0090599.

Salt Stability Test

The procedure for testing polymeric dispersions and inks used in these Examples is described below.

(a) Prepare salt solutions by diluting a stock solution (for example a 0.2 molar NaCl) with deionized water.
(b) To a glass vial (19 mm×65 mm vials with caps), add 1.5 g (ml) of salt solution with a disposable transfer pipette. (Pipette used was a SAMCO Transfer Pipette, cat #336 B/B-PET, Samco Scientific Corp, San Fernado, Calif.).
(c) Add test solution with the transfer pipette. One drop is used for dispersion concentrates. Three drops are used for ink samples.
(d) Mix the vial thoroughly with gentle swirling.
(e) Allow mixture to sit, undisturbed, for 24 hours at room temperature.
(f) Record visual observation of each sample.
Rating of 3: complete settling of pigment; transparent, uncolored liquid at top.
Rating of 2: no transparent uncolored liquid layer; definite settling onto bottom of vial observed when vial is tilted.
Rating of 1: no transparent uncolored liquid layer; very slight settling (small isolated spots) as observed during tilting of vial.
Rating of 0: no evidence of any settling.

Urea Terminated Polyurethane Dispersants, Salt Stability test.

Dispersions of 5 urea terminated polyurethanes dispersants and two comparison ionically stabilized dispersants were prepared with a magenta pigment in a manner similar to what was described above for M1-M5. These were tested for salt stability which is the test that differentiates between ionically stabilized dispersants and conventionally dispersed pigments. Each dispersion was milled for 12 passes at flow rate of 350 ml/min and 15,000 psi through the a labscale model M-110Y High Pressure Pneumatic Microfluidizer, with a Z-Chamber available from Microfluidics of Newton, Mass. KOH was used to as neutralization ingredient. Nipex 180 pigment was used at 15 wt %, a 2.5 pigment/dispersant ratio and 8% of TEB as the water miscible cosolvent. The balance of the dispersion mixture was deionized water.

TABLE 9

| | NaCl Molarity | | | | | | | | |
|---|---|---|---|---|---|---|---|---|---|
| | 0 | 0.02 | 0.04 | 0.06 | 0.08 | 0.1 | 0.14 | 0.18 | 0.2 |
| Disp. Ex. 2 | 0 | 0 | 0 | 0 | 2 | 2 | 3 | 3 | 3 |
| Disp. Ex. 8 | 0 | 0 | 1 | 2 | 3 | 3 | 3 | 3 | 3 |
| Disp. Ex. 7 | 0 | 0 | 0 | 1 | 2 | 3 | 3 | 3 | 3 |
| Disp. Ex. 6 | 0 | 0 | 0 | 0 | 2 | 3 | 3 | 3 | 3 |
| Disp. Ex. 9 | 0 | 0 | 0 | 0 | 1 | 2 | 3 | 3 | 3 |
| Comp. Disp. Ex. 2 | 0 | 0 | 0 | 0 | 1 | 2 | 3 | 3 | 3 |
| Comp. Disp. Ex. 3 | 0 | 0 | 0 | 2 | 3 | 3 | 3 | 3 | 3 |

All of the Inventive dispersions and the comparative dispersions have the property that they precipitate when tested with the salt stability. Dispersant Example 8 has a particularly low salt stability, which is particularly advantageous when this dispersion would be converted to and ink for achieving high quality inkjet printed images on a substrate.

What is claimed is:

1. An inkjet ink comprising an aqueous inkjet colorant dispersion comprising a colorant and a urea terminated polyurethane ionic dispersant dispersion in an aqueous vehicle, wherein:

(a) the ionic dispersant is physically adsorbed to the colorant, (b) the polymeric ionic dispersant stably disperses the colorant in the aqueous vehicle, (c) the volume average particle size of the dispersion is less than about 300 nm, wherein the urea terminated polyurethane dispersant comprises at least one compound of the general structure (I):

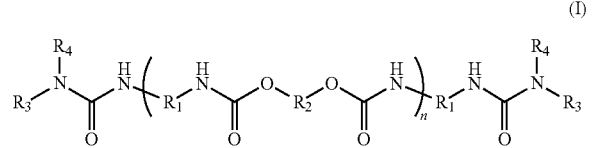

(I)

$R_1$ is aromatic, cycloaliphatic, aliphatic and mixtures thereof from a diisocyanate;

$R_3$ and $R_4$ are hydrogen, alkyl, or branched alkyl, and exclude any isocyanate reactive groups selected from the group consisting of hydroxyl, mecapto and amido, or $R_3$ and $R_4$ are groups from an amine terminating group which is bis-(methoxyethyl) amine;

$R_2$ is $Z_1$ or $Z_2$ and at least one $Z_1$ and at least one $Z_2$ must be present in the polyurethane composition:

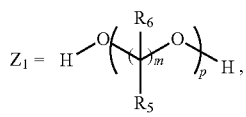

(II)

p is greater than or equal to 1, when p=1, m is greater than or equal to 3 to about 30, when p=2 or greater, m is greater than or equal to 3 to about 12;

$R_5$ and $R_6$ are hydrogen, alkyl, aryl; where $R_5$ and $R_6$ are the same or different with each $R_5$ and $R_6$ substituted methylene group and where $R_5$ and $R_6$ can be joined to form a cyclic structure;

$Z_2$ is a diol substituted with an ionic group;

wherein the urea content of the urea-terminated polyurethane is at least 2.5 weight % of the polyurethane and at most about 4.3 weight % of the polyurethane, wherein the urea content of the urea-terminated polyurethane is determined by dividing the mass of the amine terminator group by the mass of the other polyurethane components including the amine terminating agent and is reported in weight percent;

wherein the colorant is selected from pigments and disperse dyes or combinations of pigments and disperse dyes; and wherein the inkjet ink is printable on paper or textile substrates.

2. The inkjet ink of claim 1 where the urea content of the urea terminated polyurethane is at most about 4 wt. %.

3. The inkjet ink of claim 1 where the polyurethane dispersant has Structure (I), comprising the polyether diol of Structure (II) where p=2 or greater and m is greater than or equal to 3 to about 12.

4. The inkjet ink of claim 1 where the polyurethane dispersant has an ionic content of about 10 to 210 milliequivalents per 100 g of polyurethane.

5. The inkjet ink of claim 3 where the polyurethane dispersant comprises a polyether diol component wherein $Z_2$ is at least 50 weight percent of the polyether diol.

6. The inkjet ink of claim 3 where the polyurethane dispersant comprises a polyether diol component $Z_2$ which has a number average molecular weight of 200 to 5000.

7. The inkjet ink of claim 3 where the polyurethane dispersant comprises a polyether diol component $Z_2$ of Structure (II) where m=3 or 4.

8. The inkjet ink of claim 3 where $R_5$ and $R_6$ of the polyurethane dispersant are hydrogen.

9. The inkjet ink of claim 1 having viscosity at 25° C. of 6 cPs or less wherein the colorant is a pigment.

10. The inkjet ink of claim 3 where Groups $R_3$ and $R_4$ of the polyurethane dispersant are alkyl.

11. The inkjet ink of claim 1 where the colorant to urea terminated polyurethane dispersant ratio is from about 0.5 to about 6 on a weight basis.

12. An inkjet ink of claim 1, having from about 0.1 to about 10 wt % pigment based on the total weight of the ink, a weight ratio of colorant to urea terminated polyurethane dispersant of from about 0.5 to about 6, a surface tension in the range of about 20 dyne/cm to about 70 dyne/cm at 25° C., and a viscosity of lower than about 30 cP at 25° C.

13. An inkjet ink composition comprising an aqueous vehicle and colorant particles stabilized by an urea terminated polyurethane dispersant dispersion in an aqueous vehicle wherein:

the urea terminated polyurethane dispersant comprises at least one compound of the general structure (I):

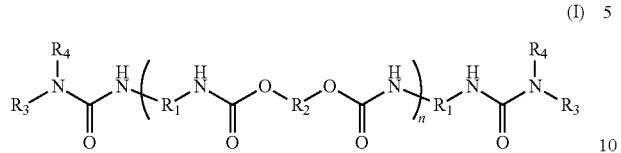
(I)

$R_1$ is aromatic, cycloaliphatic, aliphatic and mixtures thereof from a diisocyanate;
$R_3$ and $R_4$ are hydrogen, alkyl, or branched alkyl, and exclude any isocyanate reactive groups selected from the group consisting of hydroxyl, mecapto and amido, or $R_3$ and $R_4$ are groups from an amine terminating group which is bis-(methoxyethyl) amine;
n is 2 to 30;
$R_2$ is $Z_1$ or $Z_2$ and at least one $Z_1$ and at least one $Z_2$ must be present in the polyurethane composition:

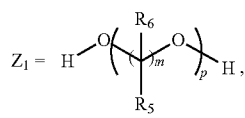
II p is greater than or equal to 1,
when p=1, m is greater than or equal to 3 to about 30,
when p=2 or greater, m is greater than or equal to 3 to about 12;
$R_5$ and $R_6$ are hydrogen, alkyl, aryl; where $R_5$ and $R_6$ are the same or different with each $R_5$ and $R_6$ substituted methylene group and where $R_5$ and $R_6$ can be joined to form a cyclic structure;
$Z_2$ is a diol substituted with an ionic group;
wherein the urea content of the urea-terminated polyurethane is at least 2.5 weight % of the polyurethane and at most about 5 weight % of the polyurethane, wherein the urea content of the urea-terminated polyurethane is determined by dividing the mass of the amine terminator group by the mass of the other polyurethane components including the amine terminating agent and is reported in weight percent, and wherein the viscosity of the urea terminated polyurethane dispersion is 45,6 cPs or less at 25°C.

14. The inkjet ink of claim 13 where the polyurethane dispersant has Structure (I) comprising the polyether diol of Structure (II) where p=2 or greater and m is greater than or equal to 3 to about 12.

15. A process for making a dispersed pigment comprising the steps of a) preparing a urea terminated polyurethane dispersant and then mixing the pigment and the urea terminated polyurethane dispersant in an aqueous carrier medium, then dispersing or deflocculating the pigment where the urea terminated polyurethane (Structure I) is prepared by
(a) providing reactants comprising (i) at least one diol $Z_1$ ii) at least one polyisocyanate component comprising a diisocyanate, and (iii) at least one hydrophilic reactant comprising at least one isocyanate reactive ingredient containing an ionic group, $Z_2$;

(b) contacting (i), (ii) and (iii) in the presence of a water-miscible organic solvent to form am isocyanate-functional polyurethane prepolymer;
(c) adding water to form an aqueous dispersion; and
(d) prior to, concurrently with or subsequent to step (c), chain-terminating the isocyanate-functional prepolymer with a primary or secondary amine;
where structure (I) is

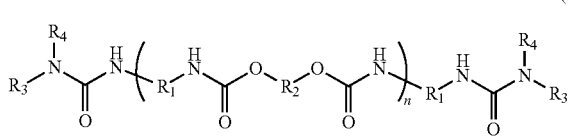
(I)

$R_1$ is aromatic, cycloaliphatic, aliphatic and mixtures thereof from a diisocyanate;
$R_3$ and $R_4$ are hydrogen, alkyl, branched alkyl, and exclude any isocyanate reactive groups selected from the group consisting of hydroxyl, mecapto and amido, or $R_3$ and $R_4$ are groups from an amine terminating group which is bis-(methoxyethyl) amine;
n is 2 to 30;
$R_2$ is $Z_1$ or $Z_2$ and at least one $Z_1$ and at least one $Z_2$ must be present in the polyurethane composition:

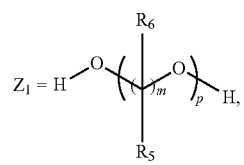
II p is greater than or equal to 1,
when p=1, m is greater than or equal to 3 to about 30,
when p=2 or greater, m is greater than or equal to 3 to about 12;
$R_5$ and $R_6$ are hydrogen, alkyl, aryl; where $R_5$ and $R_6$ are the same or different with each $R_5$ and $R_6$ substituted methylene group and where $R_5$ and $R_6$ can be joined to form a cyclic structure;
$Z_2$ is a diol substituted with an ionic group;
wherein the urea content of the urea-terminated polyurethane is at least 2.5 weight % of the polyurethane and at most about 5 weight % of the polyurethane, wherein the urea content of the urea-terminated polyurethane is determined by dividing the mass of the amine terminator group by the mass of the other polyurethane components including the amine terminating agent and is reported in weight percent, and wherein the viscosity of the urea terminated polyurethane dispersion is 45.6 cPs or less at 25°C.

16. The urea terminated polyurethane dispersant of claim 15 where the ratio of moles of amine of the chain-terminating primary or secondary amine to the moles of the isocyanate of the isocyanate-functional prepolymer is 1.0:1 to 1.2:1.

17. The aqueous colorant dispersion of claim 1 formulated for inkjet printing on textiles.

* * * * *